(12) United States Patent
Tao et al.

(10) Patent No.: US 12,718,385 B2
(45) Date of Patent: Aug. 25, 2026

(54) METHOD AND SYSTEM OF IMAGE PROCESSING WITH MULTI-SKELETON TRACKING

(71) Applicant: Intel Corporation, Santa Clara, CA (US)

(72) Inventors: Hongzhi Tao, Beijing (CN); Yikai Fang, Bejing (CN); Longwei Fang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 345 days.

(21) Appl. No.: 18/281,946

(22) PCT Filed: Apr. 26, 2021

(86) PCT No.: PCT/CN2021/089941
§ 371 (c)(1),
(2) Date: Sep. 13, 2023

(87) PCT Pub. No.: WO2022/226724
PCT Pub. Date: Nov. 3, 2022

(65) Prior Publication Data

US 2024/0161316 A1 May 16, 2024

(51) Int. Cl.
*G06T 7/246* (2017.01)
*G06T 7/277* (2017.01)
(Continued)

(52) U.S. Cl.
CPC .............. *G06T 7/251* (2017.01); *G06T 7/277* (2017.01); *G06T 7/73* (2017.01); *G06V 10/761* (2022.01);
(Continued)

(58) Field of Classification Search
CPC ........... G06T 7/251; G06T 7/277; G06T 7/73; G06T 7/292; G06T 2207/20044;
(Continued)

(56) References Cited

U.S. PATENT DOCUMENTS 11,288,835 B2 * 3/2022 Ning ......................... G06T 7/73
12,008,772 B2 * 6/2024 Zhang ..................... G06T 7/251
(Continued)

FOREIGN PATENT DOCUMENTS

CN 102609683 2/2014
CN 103559491 2/2014
(Continued)

OTHER PUBLICATIONS

Zhou, C., Ren, Z., Hua, G. (2020). Temporal Keypoint Matching and Refinement Network for Pose Estimation and Tracking, Computer Vision, ECCV 2020. Lecture Notes in Computer Science(), vol. 12367. Springer, Cham. https://doi.org/10.1007/978-3-030-58542-6_41 (Year: 2020).*
(Continued)

*Primary Examiner* — Chan S Park
*Assistant Examiner* — Paulo Andres Garcia
(74) *Attorney, Agent, or Firm* — Hanley, Flight & Zimmerman, LLC

(57) ABSTRACT

Example methods and systems for multi-skeleton tracking in reconstructions of a volumetric scene are disclosed. Measured skeletons are derived from multiple video streams and compared with predicted skeletons generated by a Kalman filter that incorporates historical pose data. A temporal object key point loss metric quantifies the difference between measured and predicted skeletons over time. Loss values form a cost matrix processed by a Hungarian assignment algorithm to match measured skeletons with predicted identities, providing stable player IDs, jersey numbers and team information.

(Continued)

500

OBTAIN A PLURALITY OF VIDEO SEQUENCES OF A SAME SCENE WITH PEOPLE 502

TRACKING A POSITION OF AT LEAST ONE OF THE PEOPLE AND TRACKED IN A RECONSTRUCTION OF THE SCENE FORMED BY USING THE VIDEO SEQUENCES 504

OBTAIN MEASURED SKELETONS OF THE PEOPLE IN THE RECONSTRUCTION 506

GENERATE PREDICTED SKELETONS ESTIMATING A SKELETON POSITION OF AT LEAST ONE OF THE PEOPLE IN THE RECONSTRUCTION 508

GENERATE TEMPORAL OBJECT KEY POINT LOSSES (TOKLs) THAT EACH REPRESENT A COST OF A MATCH BETWEEN ONE OF THE MEASURED SKELETONS AND ONE OF THE PREDICTED SKELETONS 510

WHEREIN THE TOKLs INDIVIDUALLY FACTOR A HISTORY OF POSITIONS OF THE INDIVIDUAL SKELETONS AND ASSOCIATED WITH MULTIPLE FRAMES OF THE INDIVIDUAL VIDEO SEQUENCES 512

GENERATE A MATCH BETWEEN INDIVIDUAL MEASURED SKELETONS AND INDIVIDUAL PREDICTED SKELETONS COMPRISING USING THE TOKLs 514

The matched skeletons are updated and predicted for subsequent frames, enabling real time virtual viewpoints, point of view views, and other immersive visualizations.

20 Claims, 10 Drawing Sheets

(51) Int. Cl.
*G06T 7/73* (2017.01)
*G06V 10/74* (2022.01)

(52) U.S. Cl.
CPC ............... *G06T 2207/20044* (2013.01); *G06T 2207/30196* (2013.01); *G06V 2201/07* (2022.01)

(58) Field of Classification Search
CPC ....... G06T 2207/30196; G06T 2207/07; G06T 2207/10016; G06T 2207/30221; G06V 10/761
See application file for complete search history.

(56) References Cited

U.S. PATENT DOCUMENTS

| | | | |
|---|---|---|---|
| 2010/0002908 A1 | 1/2010 | Miyamoto et al. | |
| 2012/0087539 A1 | 4/2012 | Chen et al. | |
| 2018/0047175 A1 | 2/2018 | Wang et al. | |
| 2021/0082144 A1* | 3/2021 | Kadav | G06T 7/74 |
| 2021/0312236 A1* | 10/2021 | Goncharov | G06V 40/23 |
| 2022/0079510 A1* | 3/2022 | Robillard | G16H 20/30 |
| 2023/0306054 A1* | 9/2023 | Yoshida | G06F 16/532 |

FOREIGN PATENT DOCUMENTS

| | | | |
|---|---|---|---|
| CN | 105741323 | 7/2016 | |
| CN | 105469113 | 3/2019 | |
| CN | 109858390 | 6/2019 | |
| CN | 111931549 | 11/2020 | |
| CN | 114494338 A * | 5/2022 | G06T 7/277 |
| CN | 109242950 | 5/2023 | |

OTHER PUBLICATIONS

S. Vasuhi, M. Vijayakumar and V. Vaidehi, "Real time multiple human tracking using Kalman Filter," 2015 3rd International Conference on Signal Processing, Communication and Networking (ICSCN), Chennai, India, 2015, pp. 1-6, doi: 10.1109/ICSCN.2015.7219902. (Year: 2015).*

A. Bewley, Z. Ge, L. Ott, F. Ramos and B. Upcroft, "Simple online and realtime tracking," 2016 IEEE International Conference on Image Processing (ICIP), Phoenix, AZ, USA, 2016, pp. 3464-3468, doi: 10.1109/ICIP.2016.7533003. (Year: 2016).*

Rohit Girdhar, Georgia Gkioxari, Lorenzo Torresani, Manohar Paluri, Du Tran; Proceedings of the IEEE Conference on Computer Vision and Pattern Recognition (CVPR), 2018, pp. 350-359. (Year: 2018).*

M. Buric, M. Ivasic-Kos and M. Pobar, "Player Tracking in Sports Videos," 2019 IEEE International Conference on Cloud Computing Technology and Science (CloudCom), Sydney, NSW, Australia, 2019, pp. 334-340, doi: 10.1109/CloudCom.2019.00058. (Year: 2019).*

International Searching Authority, "International Preliminary Report on Patentability," issued in connection with International Patent Application No. PCT/CN2021/089941, mailed on Nov. 9, 2023, 6 pages.

International Search Report and Written Opinion for PCT Application No. PCT/CN2021/089941, dated Jan. 28, 2022.

How a Kalman Filter Works, in Pictures, file:///C:/A-Work/Green/Matters/AD3992-PCT-IP-skeleton tracking/How a Kalman filter works, in pictures _ Bzarg.html, 17 pgs.

Andriluka, et al., 2D Human Pose Estimation: New Benchmark and State of the Art Analysis, Max Planck Institute for Informatics, Max Planck Institute for Intelligent Systems, Stanford University, 8 pgs.

Bridgeman, et al., Multi-person 3D Pose Estimation and Tracking in Sports, Adrian Hilton, CVSSP, University of Surrey, 10 pgs.

Kuhn, The Hungarian Method for the Assignment Problem—Chapter 2, Harold W. Kuhn, Princeton University, USA. M. Junger et al. (eds.), 50 Years of Integer Programming 1958-2008, DOI 10.1007/978-3-540-68279-0_2, Springer-Verlag Berlin Heidelberg 2010, 19 pgs.

Lin, et al., Microsoft COCO: Common Objects in Context, arXiv:1405.0312v3 [cs.CV] Feb. 21, 2015, 15 pgs.

Welch, et al., An Introduction to the Kalman Filter, http://www.cs.unc.edu/~{welch, gb} Copyright 2001 by ACM, Inc. http://info.acm.org/pubs/toc/CRnotice.html, 81 pgs.

Wojke, et al., Simple Online and Realtime Tracking With a Deep Association Metric, University of Koblenz-Landau, Queensland University of Technology <1https://github.com/nwojke/deep_sort>, 5 pgs.

Xiao, et al., Simple Baselines for Human Pose Estimation and Tracking, Microsoft Research Asia, University of Electronic Science and Technology of China, 16 pgs.

* cited by examiner

FIG. 1 100
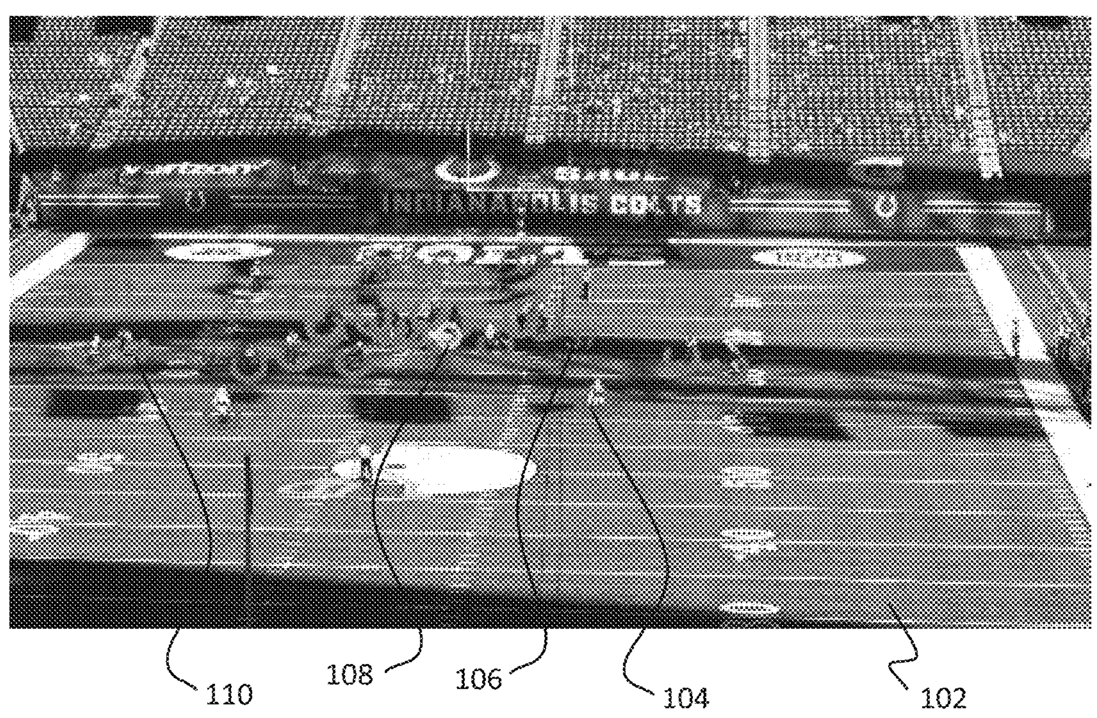
FIG. 2
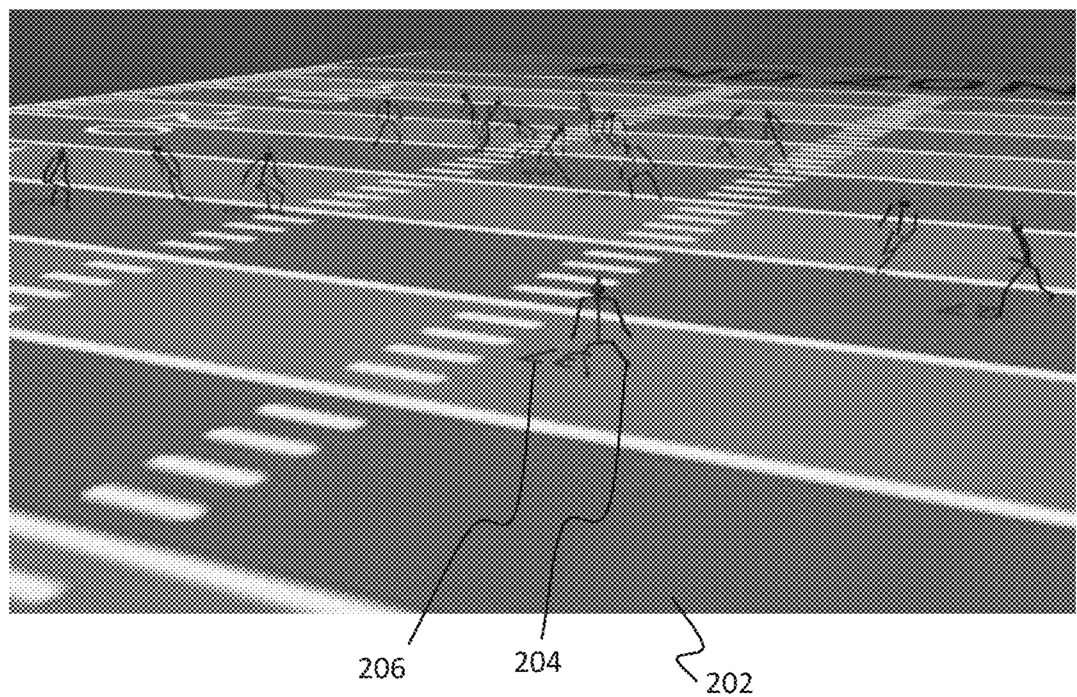

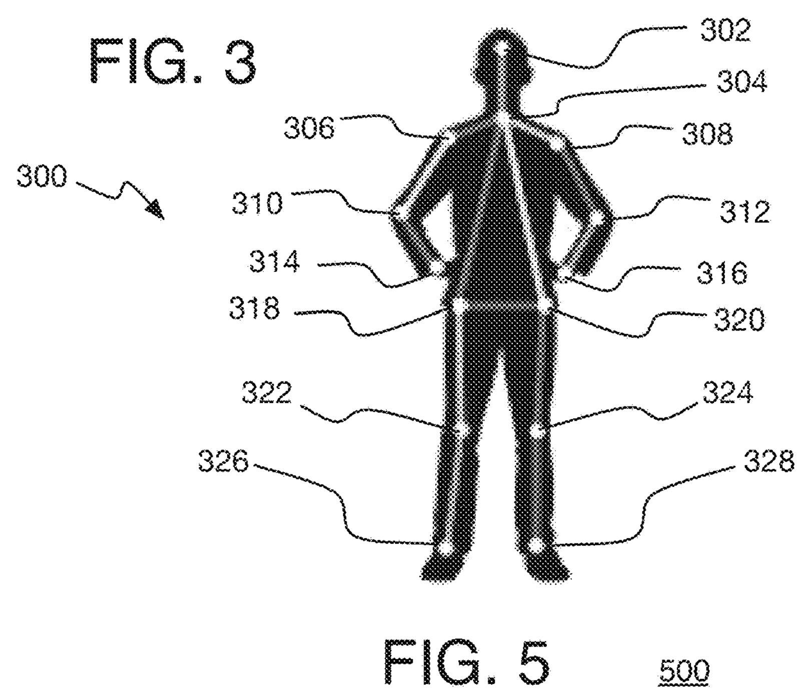

FIG. 5 500

OBTAIN A PLURALITY OF VIDEO SEQUENCES OF A SAME SCENE WITH PEOPLE 502

TRACKING A POSITION OF AT LEAST ONE OF THE PEOPLE AND TRACKED IN A RECONSTRUCTION OF THE SCENE FORMED BY USING THE VIDEO SEQUENCES 504

OBTAIN MEASURED SKELETONS OF THE PEOPLE IN THE RECONSTRUCTION 506

GENERATE PREDICTED SKELETONS ESTIMATING A SKELETON POSITION OF AT LEAST ONE OF THE PEOPLE IN THE RECONSTRUCTION 508

GENERATE TEMPORAL OBJECT KEY POINT LOSSES (TOKLs) THAT EACH REPRESENT A COST OF A MATCH BETWEEN ONE OF THE MEASURED SKELETONS AND ONE OF THE PREDICTED SKELETONS 510

WHEREIN THE TOKLs INDIVIDUALLY FACTOR A HISTORY OF POSITIONS OF THE INDIVIDUAL SKELETONS AND ASSOCIATED WITH MULTIPLE FRAMES OF THE INDIVIDUAL VIDEO SEQUENCES 512

GENERATE A MATCH BETWEEN INDIVIDUAL MEASURED SKELETONS AND INDIVIDUAL PREDICTED SKELETONS COMPRISING USING THE TOKLs 514

FIG. 4

600
Input 601
$\{S_t^1, S_t^2 \ldots S_t^Y\}$
History Memory 620
TOKL Generator 604
for every $S_t^y$ :
for every object:
do TOKL( $S_t^y$, $\{S'_{t-T+1}, \ldots, S'_{t-1}, S'_t\}$ )
N*M cost matrix
Hungarian Algorithm 606
Kalman Filter 602
618
Object 1
$\{S'_{t-T+1}, \ldots, S'_{t-1}, S'_t\}$
Prediction Unit 616
614
Object 1
$\{S'_{t-T+1}, \ldots, S'_{t-1}\}$
612
Update Unit 610
Object 1
$\{S'_{t-T+1}, \ldots, S'_{t-1}, S'_t\}$
OUTPUT 608
Skeleton with ID
for current frame

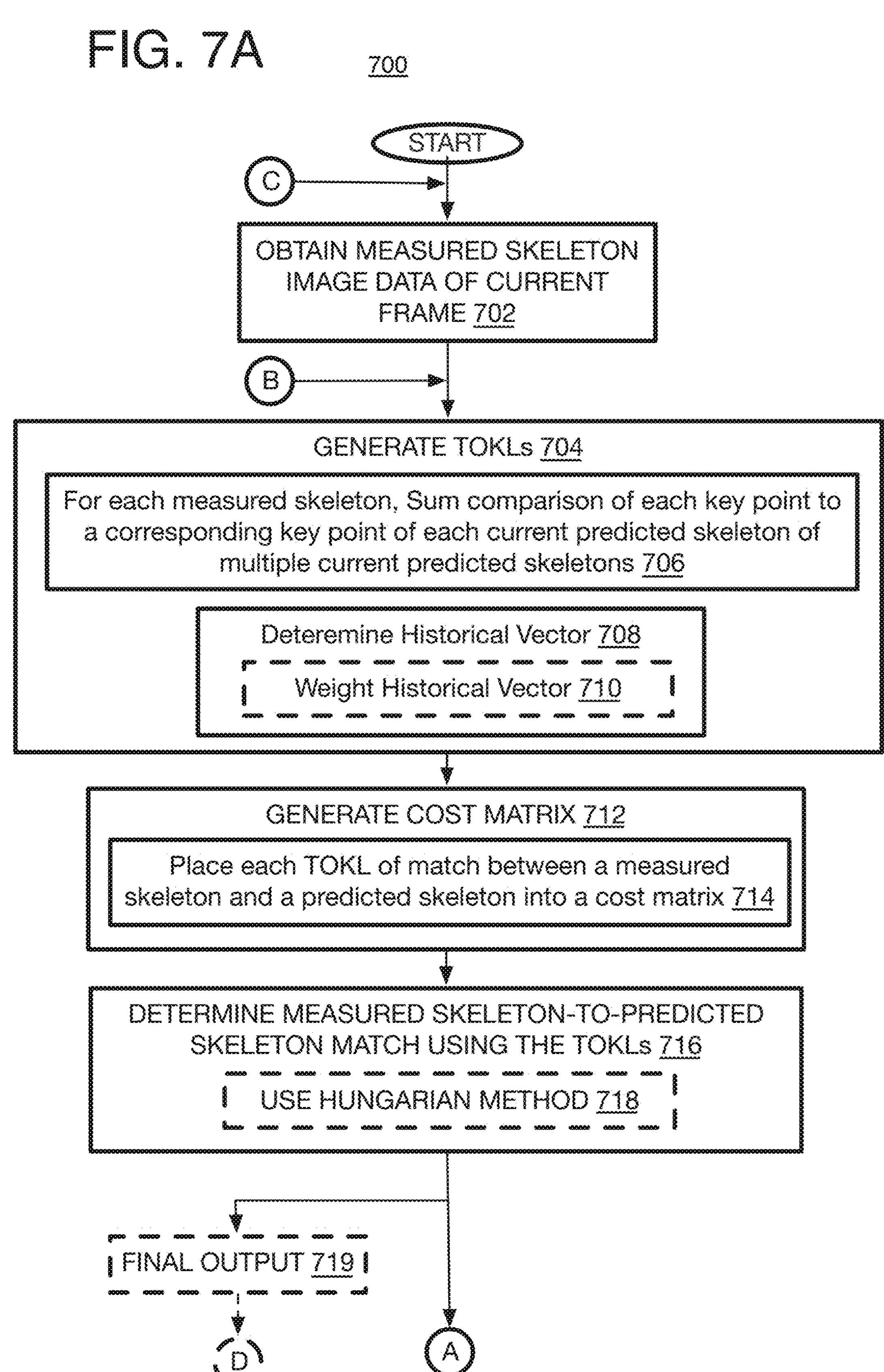
FIG. 7A
700
START
C
OBTAIN MEASURED SKELETON IMAGE DATA OF CURRENT FRAME 702
B
GENERATE TOKLs 704
For each measured skeleton, Sum comparison of each key point to a corresponding key point of each current predicted skeleton of multiple current predicted skeletons 706
Deteremine Historical Vector 708
Weight Historical Vector 710
GENERATE COST MATRIX 712
Place each TOKL of match between a measured skeleton and a predicted skeleton into a cost matrix 714
DETERMINE MEASURED SKELETON-TO-PREDICTED SKELETON MATCH USING THE TOKLs 716
USE HUNGARIAN METHOD 718
FINAL OUTPUT 719
D
A

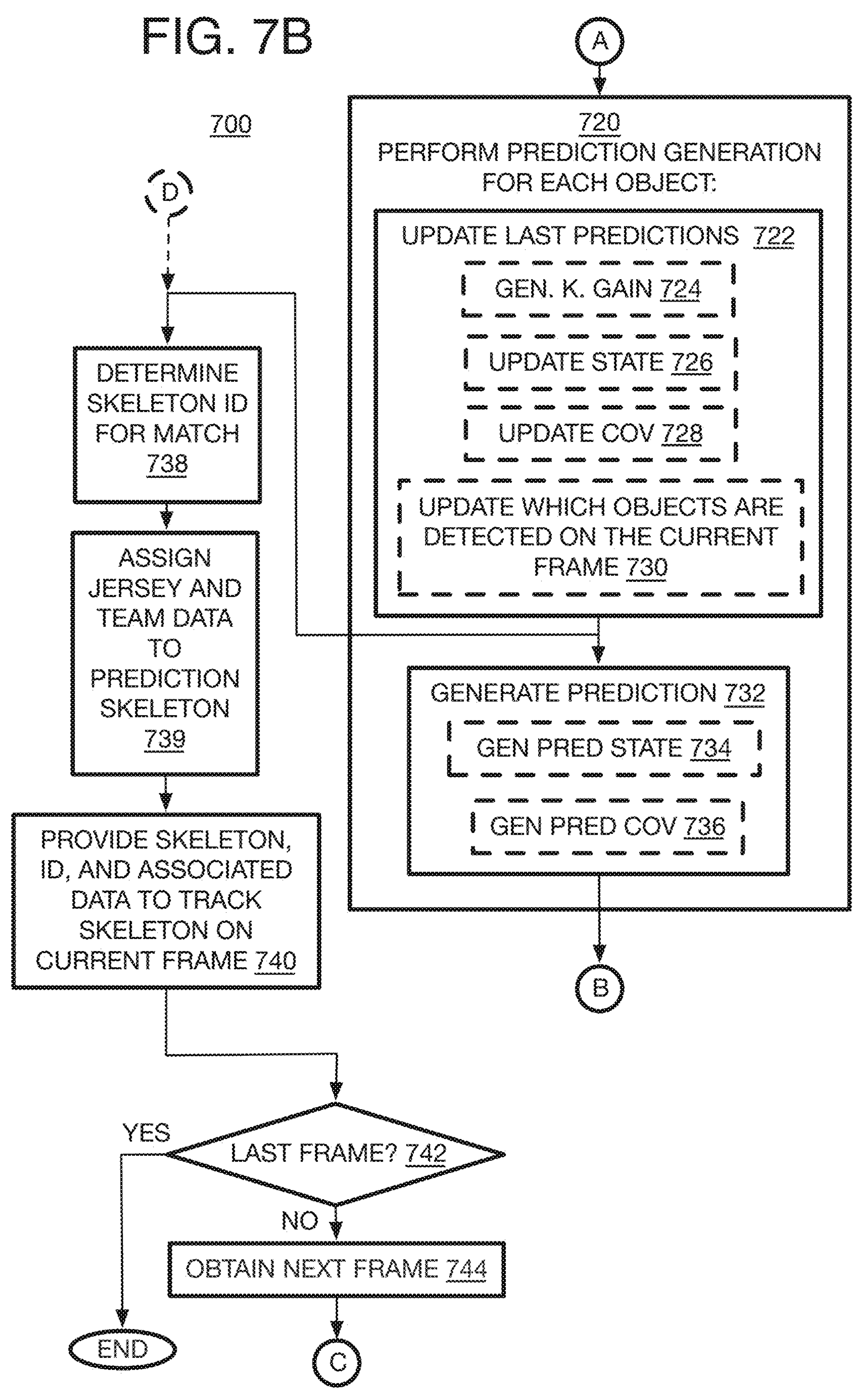
FIG. 7B
700
A
720
PERFORM PREDICTION GENERATION FOR EACH OBJECT:
UPDATE LAST PREDICTIONS 722
GEN. K. GAIN 724
UPDATE STATE 726
UPDATE COV 728
UPDATE WHICH OBJECTS ARE DETECTED ON THE CURRENT FRAME 730
GENERATE PREDICTION 732
GEN PRED STATE 734
GEN PRED COV 736
B
D
DETERMINE SKELETON ID FOR MATCH 738
ASSIGN JERSEY AND TEAM DATA TO PREDICTION SKELETON 739
PROVIDE SKELETON, ID, AND ASSOCIATED DATA TO TRACK SKELETON ON CURRENT FRAME 740
LAST FRAME? 742
YES
NO
OBTAIN NEXT FRAME 744
END
C

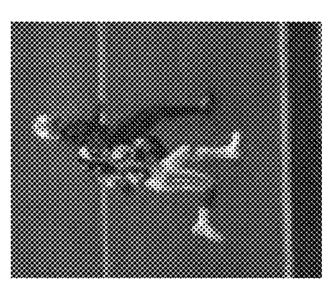
FIG. 8A
Frame 10 800
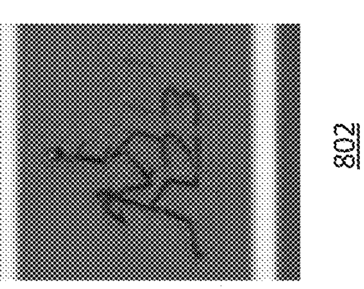
802
FIG. 8B
FIG. 9A
Frame 20 900
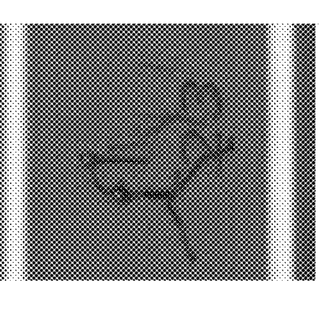
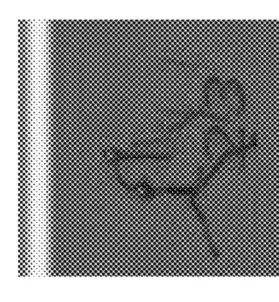
902
FIG. 9B
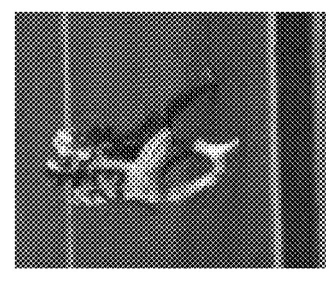
FIG. 10A
1000 Frame 30
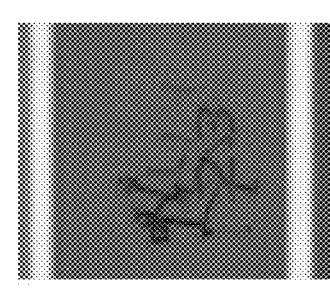
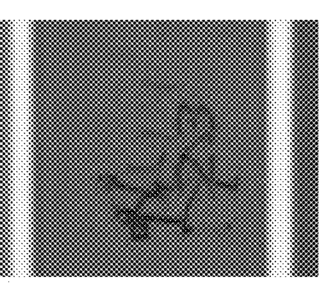
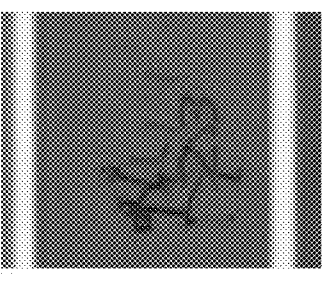
1020
FIG. 10B
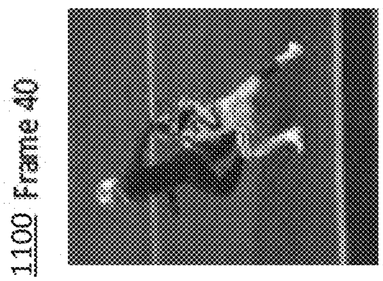
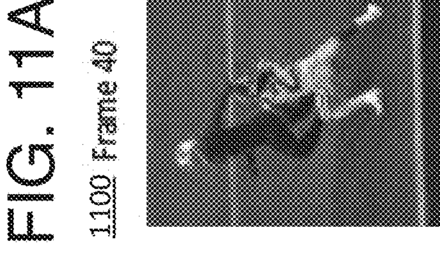
FIG. 11A
1100 Frame 40
1102
FIG. 11B
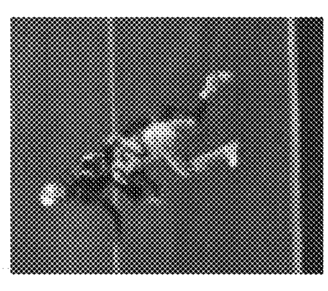
FIG. 12A
1200 Frame 50
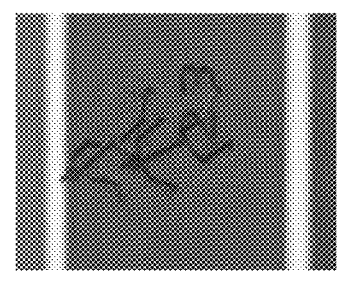
1202
FIG. 12B

METHOD AND SYSTEM OF IMAGE PROCESSING WITH MULTI-SKELETON TRACKING

CLAIM OF PRIORITY

This Application is a National Stage Entry of, and claims priority to, PCT Application No. PCT/CN2021/089941, filed on Apr. 26, 2021 and titled "METHOD AND SYSTEM OF IMAGE PROCESSING WITH MULTI-SKELETON TRACKING", which is incorporated by reference in its entirety for all purposes.

BACKGROUND

With the advancement of multi-camera, three-dimensional, immersive visual displays based on volumetric models, especially of athletic events, it is possible to rotate the scene to a desired perspective of a virtual camera view in any angle, and zoom in or out to create a desired proximity to the action including showing an athlete's view of the athletic field. Some of these applications are for commercial use by announcers or pundits at a television sports broadcasting company, video recording company, athletic league company, or the athletic team. In other applications, the viewer of the images, such as fans that watch or record the athletic events, have the ability to control the views.

In these situations, the tracking can be accomplished by using a camera array spread around an athletic field with all of the cameras pointing toward the field for example. The athletes often can be individually identified by using jersey numbers, and the position, motion, and pose of the athletes can be tracked by using estimated positions of the athlete's joints, commonly referred to as a skeleton, over time. The tracking, however, can be very difficult because the object, being people, change their shape as they move by moving their limbs or other body parts. This proves even more difficult when athletes wear the same uniform and have a similar appearance. In this case, it is difficult to automatically distinguish the athletes when their images overlap in a single view. Also, when occlusions and deformations are in the image data, and in turn in the skeleton data, conventional algorithms result in low quality images. The conventional skeleton tracking techniques also are limited when the conventional tracing algorithms are usually based on 2D bounding boxes and/or image data analysis, such as gradient analysis, and do not have sufficient 3D skeleton-based algorithms for accurate, robust athlete tracking.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

FIG. 1 is an image showing example object recognition for skeleton tracking according to at least one of the implementations disclosed herein;

FIG. 2 is an image showing example skeleton tracking and athlete identification according to at least one of the implementations disclosed herein;

FIG. 3 is a schematic diagram showing an example skeleton according to at least one of the implementations disclosed herein;

FIG. 4 is a flow chart of a method of virtual view generation that performs skeleton tracking according to at least one of the implementations herein;

FIG. 5 is a flow chart of a method of image processing with multi-skeleton tracking according to at least one of the implementations herein;

FIGS. 7A-7B is a detailed flow chart of a method of image processing with multi-skeleton tracking according to at least one of the implementations herein;

FIGS. 8A-12A are images from a video sequence and of an athletic event;

FIGS. 8B-12B are images of skeleton tracking and player identification corresponding respectively to images 8A-12A and according to at least one of the implementations herein;

DETAILED DESCRIPTION

Figure 6:
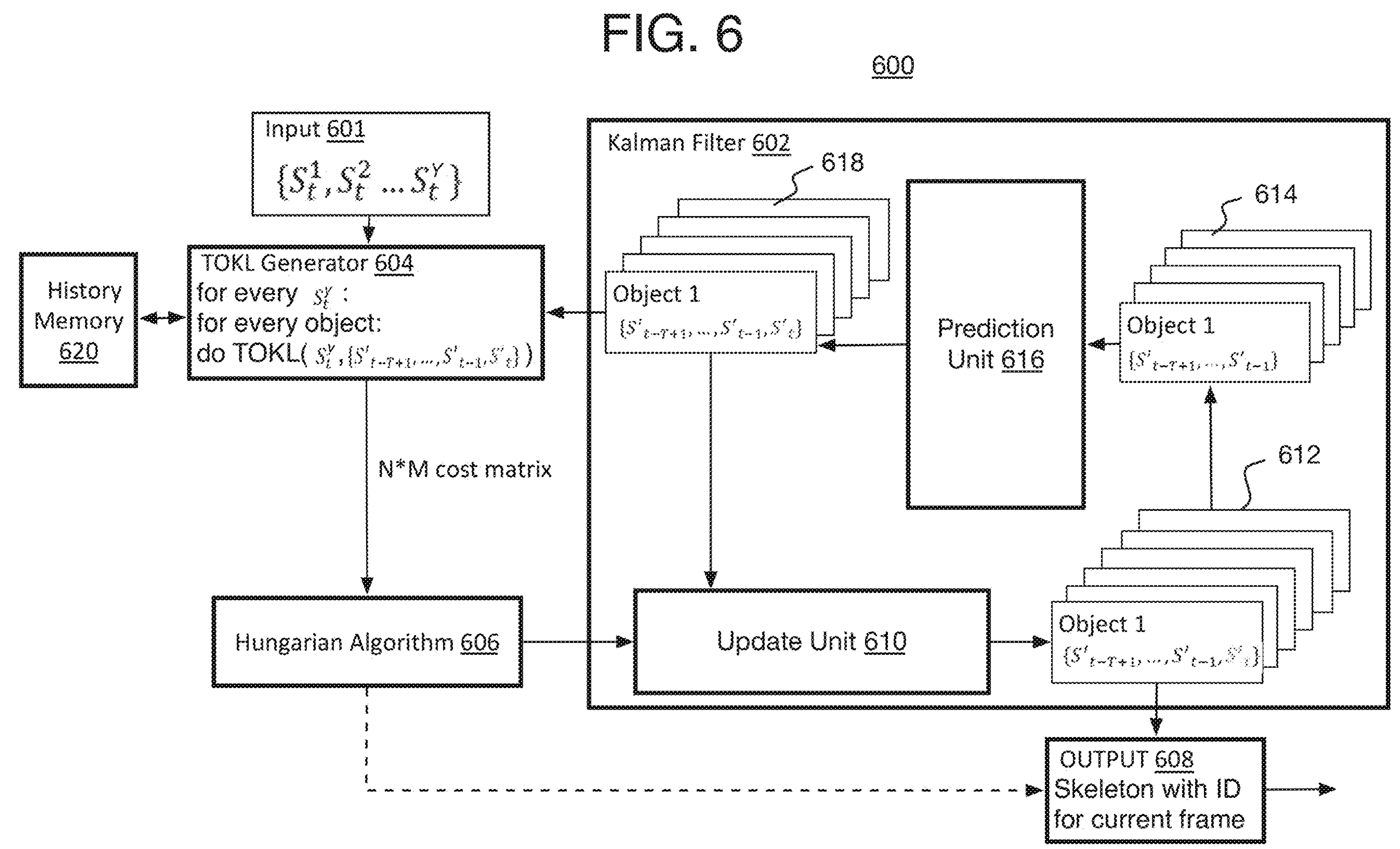
FIG. 6 is a schematic diagram of a skeleton tracking system to perform multi-skeleton tracking according to at least one of the implementations herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures that may be, or include, processor circuitry such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices, professional electronic devices such as one or more commercial television cameras, video cameras, or camera arrays that are disposed to record motion of an event or otherwise one or more people, animals, or other objects in motion by the cameras, and/or consumer electronic (CE) devices such as imaging devices, digital cameras, smart phones, webcams, video cameras, video game panels or consoles, televisions, set top boxes, and so forth, may implement the techniques and/or arrangements described herein, and whether a single camera or multi-camera system. Further, while the following description may set forth numerous specific details such as logic implementations, types and interrelationships of system components, logic partitioning and/or integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on at least one machine-readable or computer-readable medium or memory, which may be read and executed by one or more processors formed by processor circuitry. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer or machine readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of image processing with multi-skeleton tracking are described herein.

Conventional object or people tracking at athletic events often uses volumetric videos that now allow television show presenters, sports pundits and announcers, and even fans to interact and personalize sports content, and generate perspectives from almost any angle. This involves multiple high-resolution cameras installed around a stadium, arena, or other event, and computer vision technologies developed to create 3D volumetric models that can be used to track 3D movement of players and a ball. In these cases, a virtual camera view can be created to follow a player or ball in a 3D scene to achieve an immersive experience.

For conventional multi-object tracking, most tracking algorithms use 2D bounding boxes to match features in frames from different cameras. In one example, a multiple object tracking technique combines appearance features output from convolutional neural network (CNN) models and motion features generated by a Kalman filter for matching objects between frames. For multi-object 2D pose tracking, one unified solution is similar to Deep Sort that uses a type of object similarity measure for matching features from different frames and uses optical flow to handle occlusion. These 2D bounding box techniques, however, are usually limited when these techniques often only have location and identification information in 2D image space, and use 2D-based algorithms, so that these techniques are not compatible with 3D applications. Other 2D techniques track many different objects in addition to the athletes or skeletons, and therefore are too computationally heavy for many devices.

Other 2D pose-tracking techniques additionally cannot extrapolate from 2D pose to 3D skeleton because some key component cannot be used in 3D space. For example, optical flow is often used in multi-object pose tracking when occlusion and crowding occur, and its calculations use gradients between adjacent pixels in an image. However, in reduced load 3D skeleton tracking, only 3D coordinates of skeleton points are the input to the system without using 2D image data such as the chroma and luma pixel values or gradients.

Otherwise, 3D multi-skeleton tracking, in contrast to multi-object tracking and multi-object 2D pose tracking, focuses on accurate and stable skeleton point positions in 3D space and assigning the correct player ID to each of the skeletons. However, many conventional 3D multi-skeleton tracking systems use multi-camera sports videos and Euclidean distance directly to measure the difference in position between skeletons on different frames without further prediction factors. This is not sufficiently robust for structured skeleton information because it does not factor historical data, and specifically predictions of skeleton key point locations based on historical data, and in turn, does not consider differences between the predictions and measured or actual image skeletons. Without such sophisticated factors, skeleton tracking that uses temporal Euclidean distance measures alone still result in significant errors when key points of different skeletons are close or overlap in views. Also, these systems usually perform consecutive skeleton matching in an offline mode due to the large computational load of the system, which causes a delay of a number of frames so that real-time operation cannot be provided, or the system cannot be provided on small devices.

Thus, many challenges exist for such skeleton tracking such as occlusion where data is missing, deformation where key points are in the wrong location, similar appearance where two players of the same team wearing a same jersey confuse the skeleton tracking algorithms so that skeleton key point locating is wrong or impossible, and so forth. The result is low quality skeleton tracking where resulting images from virtual views of a 3D reconstruction of the skeletons have artifacts and/or skeletons that are identified incorrectly. Few works focus on multi-object 3D skeleton tracking that reduces or eliminates these difficulties.

To resolve the issues mentioned above, it has been found that the artifacts and mis-identification of skeletons can be reduced by carefully tracking and factoring the historical position of skeletons temporally along the video sequences and while simultaneously spatially differentiating the skeletons from each other on the same frame. To accomplish this, the disclosed method and system present a 3D multi-skeleton tracking solution that uses a cost metric for skeleton tracking referred to as a temporal object key point loss (TOKL). The TOKL may be used for online multi-player 3D skeleton tracking for team sports, by one example, and which may track objects on a sequence of consecutive frames, or some interval of frames, along a video sequence, and in real-time, or substantially real-time, on small devices. Cost provided by the TOKL here refers to a representation of difference in position from a measured or actual skeleton on a 3D reconstruction derived from multiple videos and a predicted skeleton. The cost also at least factors the historical position data of the skeleton over a number of frames of the video sequences, and may factor a number of other parameters. By modeling skeletons in temporal and spatial domains simultaneously in the form of the TOKL, the disclosed method measures a loss between reconstructed skeleton trajectories and predicted skeleton data much more accurately than conventional methods.

By another aspect, a 3D multi-skeleton tracking pipeline is specifically arranged to use the TOKL metric. This includes using a Kalman filter to at least provide skeleton location predictions (referred to herein as predicted skeletons). The Kalman filter is a state estimator used when direct measurements of a desired parameter are not available. The TOKL for a skeleton is then generated using a series of object key point similarities (oks's), placed in an OKS vector, where each oks is at least based on a difference between a measured (or actual) skeleton in a 3D reconstruction generated from multiple videos and a predicted skeleton from the Kalman filter. The series of historical skeletons are then weighted to form the TOKL so the later the skeleton, the less influence that skeleton has upon the TOKL. The TOKLs for each object are then used as costs in a Hungarian algorithm matrix or other matching algorithm to match each object (or predicted skeleton) to a measured skeleton. This raises the accuracy of the matches by the Hungarian algorithm.

The resulting matches are then provided for updating and prediction of the next skeleton. The Kalman filter uses an updating operation to refine the key point locations of the matched predicted skeleton by using the measured skeleton matched to the predicted skeleton. Thereafter, the Kalman filter performs prediction by using the previous matched and updated previous predicted skeletons to generate a next current predicted skeleton for a next frame, thereby representing the historical data of the TOKLs. So arranged, the Kalman filter can be said to maintain inner tracking status (or in other words, historical-based status) of the skeletons. This enables the Kalman filter to handle very difficult imaging situations and still output very accurate matching results anyway, such as with skeletons missing key point data and erroneous key point locations. The result is very highly accurate skeleton tracking that enables very immersive athlete, or other person, view experiences. It will be appreciated that the phrase "next frame", or being "on a frame", mentioned anywhere herein may refer to objects or skeletons being tracked that exist on the reconstruction at a certain frame time point, depending on the context.

Referring to FIG. 1, an image 100 shows an example environment of the present multi-skeleton tracking system and shows an athletic field 102 with two teams playing in an athletic event, here being American football, where each player has been segmented and recognized by an arc 104 or 110. The players' teams also are identified by the color of the arc 104 which is red or arc 110 which is blue (although the colors may not be visible in the figure). A ball 108 is identified in a yellow circle. Each player also has an identification number 106 (being 37 pointed to here) which may be the jersey number of the player.

Referring to FIG. 2, an image 200 shows the results of the multi-skeleton tracking method and system where each player on the athletic field 202 is represented by a skeleton 204 and the player's jersey number (or other identification number) 206. The skeleton 204 and/or jersey number 206 may be a different color to identify the team of a player.

Referring to FIG. 3, an example skeleton 300 to be tracked may be generated by recognizing and grouping 3D key points. The skeleton 300 may have a number of key points and different arrangements mainly representing human bone joints. In this example, skeleton 300 has fourteen key points including key points of a head 302, neck 304, left and right shoulders 306 and 308, left and right elbows 310 and 312, left and right wrists 314 and 316, left and right hips 318 and 320, left and right knees 322 and 324, and left and right ankles 326 and 328. The skeletons may be in many different poses where the key points are different distances and directions from each other for different poses. By one example, an athlete's point of view can be achieved by tracking the head and neck key points to determine the orientation of the head.

Figure 4:
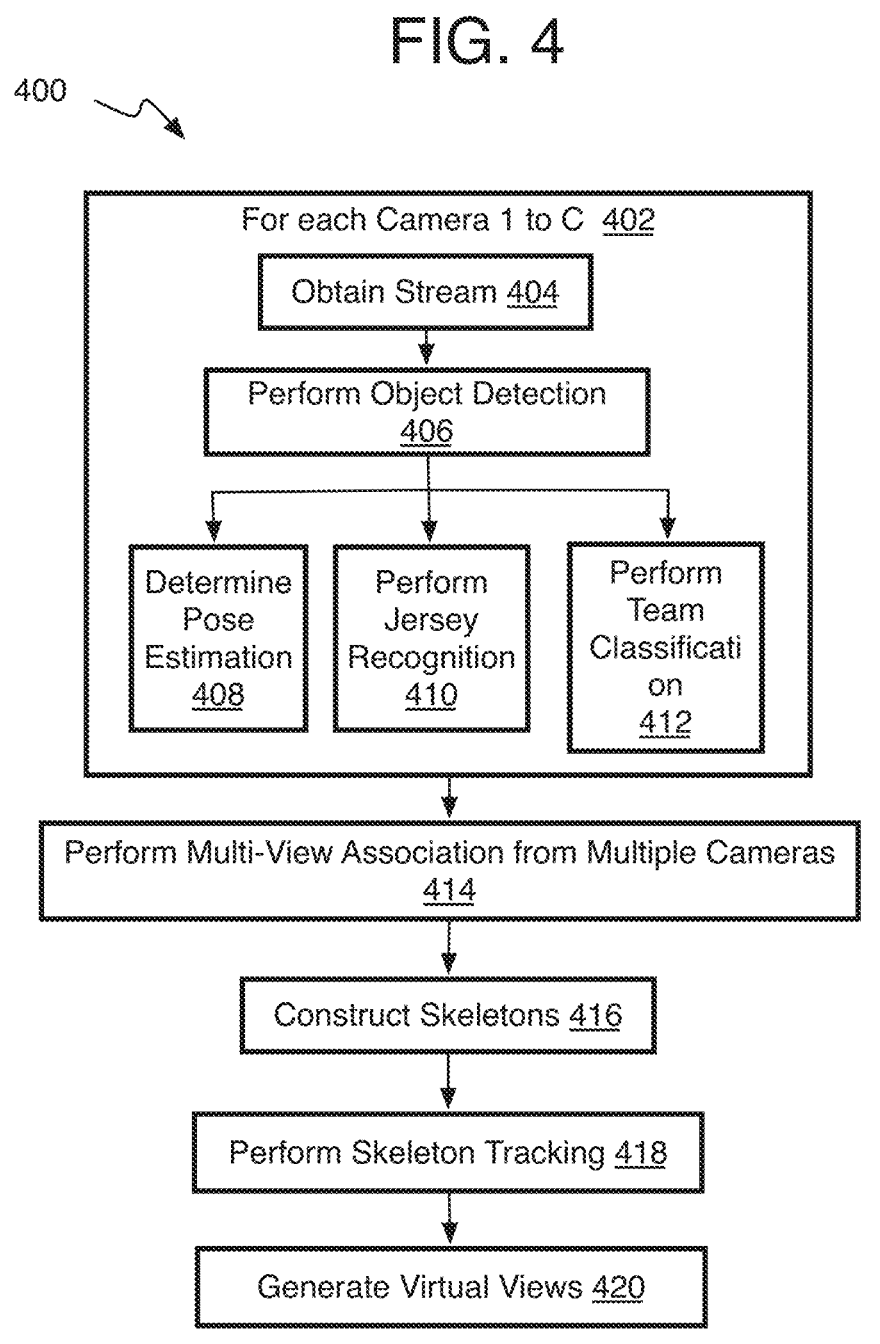

Referring to FIG. 4, an example process 400 is a computer-implemented method of image processing for generating virtual views as one example application of the skeleton tracking. In the illustrated implementation, process 400 may include one or more operations, functions or actions as illustrated by one or more of operations 402 to 420 numbered evenly. By way of non-limiting example, process 400 may be described herein with reference to example image processing systems 600 and 1300 of FIGS. 6 and 13 respectively, and where relevant.

Process 400 includes receiving images from multiple cameras, and by one example "for each camera 1 to C" 402, a video stream is obtained 404 and of the same scene with each camera showing one or more people (or animals or other objects) from a different perspective. This may include capturing video sequences from a camera array around a stadium, arena, rink, field, stage, or other area that provides a sport or other event that can be amid at least two cameras of the camera array. The sport may be team sports such as baseball, American football, soccer, basketball, rugby, cricket, lacrosse, hockey, or any other sport with multiple players on a play field, and which may include racing where racers wear a jersey number such as swimming, horse racing where jockeys where jersey numbers, and so forth. Also, the event is not limited to sports. Any activity with actions of multiple objects that can be represented as a moving articulated skeleton may be analyzed and tracked. Alternatively, the video sequences could be captured by a single camera instead of a camera array, or few moving cameras in a small camera array, that capture a fixed scene or very slow moving scene.

Also, the cameras may be commercial-grade high-definition cameras, whether wired or wireless with wi-fi capability, such as TruVision® Wedge (TVW) cameras or Canon® electro-optical system (EOS) cameras, and by one example, is at least about 18 cameras. The captured images may be in a color scheme (YUV, RGB, and so forth), grey-scale, or black and white, or may be from one or more cameras in the camera array that capture non-vision range images such as infrared (IR), and so forth.

Obtaining the video streams also may include pre-processing the image data at least sufficiently for the operations disclosed herein including the skeleton tracking. Thus, raw image data may be obtained from cameras or camera memory, and pre-processing may include demosaicing, color correction, de-noising, and so forth. Otherwise, pre-processed video sequence image data may be obtained from memory and decoded when transmission to the skeleton tracking system is desired.

Object recognition or detection 406 then may be performed separately on each video sequence streamed from the cameras, and which may or may not include semantic recognition. The object recognition techniques may use neural network or machine learning techniques that identify the objects such as people (or here athletes), a ball or puck for example, and other objects as desired. Such neural networks may be trained for a specific sport or event. Such object recognition may result in 2D bounding boxes or object segmentation boundary around each recognized object or person (or player or athlete), and on each or individual frame of a video sequence of each camera of a camera array being used. This establishes the 2D position in a frame (or 2D image space) for each or individual object or person being tracked.

Thereafter, process 400 may include pose estimation 408, jersey recognition 410, and team classification 412 that each attach or associate a respective identifier (pose, jersey number, and/or team) to a recognized object. The pose estimation, jersey number recognition, and team classification can run in parallel, and may include the processing of image patches cropped from person detection results, such as 2D bounding boxes, and from the separate video sequences (or separate views). The resulting pose data may be 2D pose data that first establishes key points for each detected person in each camera view. Techniques used to generate the poses and key points may include Hour-Glass algorithms and/or Cascaded Pyramid Networks.

Process 400 may include "perform multi-view association from multiple cameras" 414. Once the 2D pose data is obtained, multi-camera view analysis will match features or recognized objects in frames from the same or similar time point and from the different video sequences, and matched by triangulation and/or other techniques. This may involve finding correspondences between detected 2D bounding boxes from the individual camera views and belonging to the same person (or player), and also may involve generating depth maps and a 3D model or reconstruction of the scene that was captured. Then, the system may map any key points from the 2D poses to 3D coordinate locations on the reconstruction. Thus, while the skeleton 3D key points may be mapped to the reconstruction, the key points are not yet grouped to form skeletons. The multi-view association may result in depth maps and a 3D model or reconstruction of the captured scene thereby forming an environment for volumetric skeleton tracking.

Process 400 may include "construct skeletons" 416 where a construction algorithm determines a 3D bounding box and the skeleton key point locations within the box for the individual objects recognized as a person (or player or athlete). Such skeleton construction may be performed by triangulation. This determines the measured locations of the key points of the skeletons within the 3D model or reconstruction (also referred to as the actual or measured skeletons), and may determine a label for the key points (head, neck, and so forth for example). Thus, the result is measured skeletons with an anchor point (at a corner of a 3D bounding box for example) and the measured key point locations within the 3D reconstruction. At this operation then, 3D skeletons are established, but only at individual time points (or frame points). The skeletons are not linked temporally yet.

Once the skeletons are generated, process 400 may include "perform skeleton tracking" 418. The multi-player 3D skeleton tracking solution links corresponding skeletons temporally from time point to time point (or frame to frame along the video sequences), and focuses on matching measured 3D skeletons with person (or player) IDs to predicted skeletons, as well as then assigning jersey numbers and team data to each person (or player) ID with a 3D skeleton. The skeleton tracking method described herein generates TOKL values that factor skeleton histories to increase the accuracy of the matches between the predicted skeletons and the measured skeletons as well as the accuracy of the predicted skeleton key point locations. The details are provided below with skeleton tracking process 500 and 700, and may be performed by skeleton tracking system 600.

Once, or as, the skeleton tracking is performed, process 400 may include "generate virtual views" 420. Thus, with the skeleton tracking where player IDs are matched to the detected objects (or predicted skeletons), 3D virtual views can be generated that rotates the action in the captured scene and/or provides point-of-view (POV) of one of the players on an athletic field for example. Such techniques that can use the skeleton tracking to generate virtual views include Structure from Motion (SFM) and Simultaneous Localization and Mapping (SLAM) algorithms. Otherwise, the skeleton tracking can be used for image quality refinement, image coding efficiency, person (or athlete) display and/or motion analysis (such as for training, or rating the skill of the motion), and/or surveillance, event detection, and/or automatic driving.

Referring to FIG. 5, an example process 500 is a computer-implemented method of image processing with multi-skeleton tracking. In the illustrated implementation, process 500 may include one or more operations, functions or actions as illustrated by one or more of operations 502 to 514 numbered evenly. By way of non-limiting example, process 500 may be described herein with reference to example image processing systems 600 and 1300 of FIGS. 6 and 13 respectively, and where relevant.

Process 500 may include "obtain a plurality of video sequences of a same scene with people" 502. This may include obtaining image data of images capturing an athletic event, for example, where one or more athletes or players are on an area surrounded by, or among, an array of cameras each recording the event from a different perspective. Each camera may provide a video sequence of the one or more people including athletes to track in motion and poses, and from different perspectives. By other alternatives, other objects with IDs may be tracked that are other than people, such as animals as with racing horses, dogs, and so forth, or other objects, such as vehicles.

Process 500 may include "tracking a position of at least one of the people and tracked in a reconstruction of the scene formed by using the video sequences" 504. The tracking operation may include "obtain measured skeletons of the people in the reconstruction" 506. This may involve providing a 3D reconstruction of the scene, and providing the location of bounding boxes, which may be 3D bounding boxes, and key point locations of detected and located (referred to as measured) skeletons within the reconstruction of the scene.

The tracking operation 504 may include "generate predicted skeletons estimating a skeleton position of at least one of the people in the reconstruction" 508. Here, the prediction may be generated by a Kalman filer where the Kalman filter determines a current predicted skeleton based on a previous updated predicted skeleton, and specifically predicting the predicted key point locations of the predicted skeleton. Particularly, the Kalman filter is a set of equations that provide efficient computational and recursive operation to estimate a state of a process, and by one form, in a way that minimizes the mean of the squared error. In other words, the Kalman filter has a prediction mode that generates a new best estimate that is a prediction for a current time point or frame made from a previous best estimate of a previous time point or frame, and predicts a new uncertainty from an old uncertainty while factoring additional uncertainty from the environment, such as process noise. The Kalman filter also has an update or correction mode that refines the last prediction estimate and last uncertainty estimate by using a corresponding measured skeleton as explained below. The updated predicted skeleton is used to generate a new current predicted skeleton for a next frame (or time point) of the same object (same tracked skeleton).

The tracking operation 504 may include "generate temporal object key point losses (TOKLs) that each represent a cost of a match between one of the measured skeletons and one of the predicted skeletons" 510. Here, the predicted skeletons of a frame are individually compared to individual measured skeletons detected on a frame. By one example approach, and for each potential pair of measured and predicted skeletons, the differences in corresponding key point locations may be determined and summed, and then used to generate an object key point similarity (oks) value, which in turn forms an object key point loss (okl) value for each of the potential pairs. The sum then may be modified by other factors to form the oks as explained below, but otherwise could be averaged to form an average difference of the skeleton comparison, or used to compute a different version of the sum to generate the oks.

The tracking operation 504 also may include "wherein the TOKLs individually factor a history of positions of the individual skeletons and associated with multiple frames of the individual video sequences" 512. In other words, this operation refers to generating temporal object key point losses (TOKLs) that each at least represent a history of differences between the measured and predicted skeletons. Specifically, for each or individual skeleton or object (or in other words, in a per skeleton (or object) basis), the okls may be buffered for a certain number of time points or frames, which can then be used to form a historical vector OKL for each predicted skeleton to be tracked and that preserves the temporal cost history for a potential measurement-predicted skeleton match. The OKL then may be weighted by applying a weight vector using dot product for example, in order to generate the TOKL for a potential match. The weighting reduces the influence of an okl as the okl becomes older in terms of time point or frame order in the video sequences.

The tracking operation 504 may include "generate a match between individual measured skeletons and individual predicted skeletons comprising using the TOKLs" 514. Here, the TOKLs of a single time point (or frame) are placed into a cost matrix as the costs for a data matching algorithm such a Hungarian algorithm for example that matches the measured skeletons and the predicted skeletons by determining the minimum cost to make all matches for a frame or time point. The resulting low cost matches then are either used to output the prediction skeleton for use or provided to the Kalman filter again, where the update or correction operations of the Kalman filter may refine the current (or now previous) predicted skeleton to be used to generate a next predicted skeleton. The revised key point locations of a revised or updated current (or now previous) predicted skeleton may be used as the final output skeleton to provide key point locations. The refinement or updating further increases the accuracy of the key point locations. The player ID, and in turn jersey number and team data, assigned to the matching measured skeleton are now unified with, or more precisely given or assigned to, the output prediction skeleton whether the output prediction skeleton is retrieved directly from the Hungarian algorithm or later as a refined previous predicted skeleton.

With several association results buffered for each tracked player ID, the system may apply a voting process to assign the player ID, final jersey number, and/or team data to the predicted skeleton to be output by using the jersey number and team data from multiple views belonging to the same player and saved in memory. Thus, it can be stated that the skeleton tracking process also may perform assignments for the tracking ID, jersey number, and team data, with the help of the buffers used to form the TOKLs, and in turn, the inner tracking status at the Kalman filter that is used to form the predicted skeletons.

Thus, the skeleton tracking process makes tracking results smooth and accurate, such as from the use of a Kalman filter that provides predictions by factoring historical data and matching measured skeletons, and the Hungarian algorithm that assists to accurately assign person ID, jersey number, and team data generated from historical data, all while the Kalman filter adjusts skeleton position trajectories by refining the skeletons to robustly handle skeleton data omissions and erroneous key point locations. As a result, an accurate and stable player (or person) ID is obtained for an accurate predicted skeleton.

Referring now to FIG. 6, image processing system or device 600 performs skeleton tracking and may have a temporal object key point loss (TOKL) unit 604 that receives the measured skeletons as input 601 as well as predicted skeletons 618 from a prediction unit that may be a Kalman filter 602. The TOKL unit 604 also may use a history memory or buffer 620 that stores historical skeleton data such as previous object key point loss (okl) values or previous time points (or previous frames), but also may store skeleton, or person. IDs, jersey number data, team data, and other data associated with specific people or objects being tracked. This data also may be stored on other memories. The TOKLs are the costs placed into a cost matrix, and the cost matrix may be provided to a Hungarian algorithm unit 606 to determine the best match between measured and predicted skeletons (or detected objects). The matches and predicted skeletons from the Hungarian algorithm unit 606 may be provided directly to an output or association unit 608 of the system 600, or the predicted skeletons first may be refined by providing the matches to an update unit 610 of the Kalman filter 602 to generate refined predicted skeletons 612. The refined and updated predicted skeletons are then provided to the output unit 608 to associate a predicted skeleton to person and/or team data. After the refinement by the update unit 610, the refined predicted skeletons 612 are then the input 614 to a prediction unit 616. The prediction unit 616 then generates the predicted skeletons 618 of a next frame or time point of the same tracked object (or skeleton) to generate TOKLs for a next frame. System 600 is used to perform the skeleton tracking as described in process 700. It should be noted S is a skeleton, t=0 to T time points or frame order number, while y=1 to Y objects (or skeletons to be tracked) on a single frame. Other details are provided below with process 700.

Referring now to FIGS. 7A-7B, an example process 700 is a computer-implemented method of image processing with multi-skeleton tracking. Process 700 may include one or more operations, functions or actions as illustrated by one or more of operations 702 to 744 generally numbered evenly. By way of non-limiting example, process 700 may be described herein with reference to example image processing systems 600 and 1300 of FIGS. 6 and 13 respectively, and where relevant.

In general, and by one example form, a Kalman filter is used to predict stable and robust tracking status based on historical data. Specifically, the history-based (or temporal-based) TOKL metrics are used in a cost matrix of a similarity algorithm such as a Hungarian algorithm to assign identities based on matches between predicted skeletons and measured skeletons that already provide the spatial domain analysis of the skeletons. The Kalman filter uses these matches to refine a current prediction state or predicted skeleton that is then used to determine a next prediction state or predicted skeleton of a next frame and for the same object. Since the Kalman filter is based on both a similarity between skeletons of consecutive frames and longer historical similarities between skeletons by using the TOKL metric, the result is a very accurate and robust system. The details are provided as follows.

Process 700 may include "obtain measured skeleton image data of current frame" 702, and this operation includes obtaining measured skeletons from the reconstruction of the scene captured by the camera array and as described above. The measured skeletons may include, or may be associated with, 3D key point locations of the skeleton, a definition of a 3D bounding box holding the skeleton, and a location of the 3D bounding box within the reconstruction. The key point locations of the skeleton within the reconstruction may be listed with coordinates relative to the global 3D coordinates of the reconstruction or relative to the definition of the 3D bounding box holding the skeleton. The measured skeletons may be provided for each time point or set of frames at the same time, which may or may not be the same frame count of a video sequence. The measured skeletons may be designated as $$\{S_t^1, S_t^2, \ldots S_t^Y\}$$

(FIG. 6) where y=1 to Y detected people (or other objects being analyzed) in the reconstruction, and in turn number of skeletons, from a substantially single time point (or single frame time point) and single set of frames capturing the scene at substantially the same time from various cameras.

Process 700 may include "generate TOKLs" 704. Here, the TOKL metric is generated using the set of measured skeletons as well as the predicted skeletons from the Kalman filter. To generate the predicted skeletons by one form, the Kalman filter models each person's skeleton by using all available 3D skeleton joints. In the first frame, each person's measured skeleton may be used directly to initialize a predicted skeleton (or tracked person or player). By other options, the prediction may be skipped for the first frame or initial default predictions may be used to generate the matches between the measured and predicted skeletons. By other forms, the predicted skeleton key point locations are merely all set at (0,0,0) to be differenced from the measured skeletons. Thereafter, predicted skeletons are obtained from the Kalman filter that indirectly factor the TOKLs used to generate the measured-predicted skeleton matches.

Thereafter the first frame, and as shown on FIG. 6, it is sufficient to mention that for a current object (or skeleton being tracked) and current frame, the prediction unit (such as the Kalman filter) may provide a current predicted skeleton $$S_t'$$

(FIG. 6) to determine a current $oks_i$ and to be collected with the previously computed oks's based on previous predicted skeletons as explained below.

A TOKL is generated for the individual method skeletons $$S_t^y$$

in a single time point (or frame set). This could be every frame time point, or the TOKLs may be generated at intervals such as every $5^{th}$ or $10^{th}$ frame along the video sequences, whatever is found to be most efficient, provide the best quality, or is otherwise desired. The TOKL metric for a single object measures the loss (or cost) between a same measured skeleton as tracked from frame to frame along a video sequence to form a series of measured skeletons, and a series of historical predicted skeletons that are each compared to this same measured skeleton, albeit on a different frame or different time point for each comparison. The TOKL is computed by using equations (1) to (6) below.

Process 700 may include "for each measured skeleton, sum comparison of each key point to a corresponding key point of each current predicted skeleton of multiple current predicted skeletons" 706. Thus, each current predicted skeleton is for a different object (different skeleton to be tracked and found in the frame, or more precisely, the reconstruction). This is performed by using TOKL equation (1) that models the differences between measured and predicted skeletons as follows.

$$oks_i = \frac{\sum_{n=1}^{N} e^{-\frac{d^2}{2V^2\sigma^2}} \delta(v_n = 1)}{\sum_{n=1}^{N} \delta(v_n = 1)} \quad (1)$$

$$okl_i = 1 - oks_i \quad (2)$$

where $oks_i$ is object key point similarity between an input measured skeleton $$S_t^y$$

obtained from the reconstruction and a predicted skeleton $$S_t'$$

obtained from the prediction unit or Kalman filter unit. Also, the 'e' refers to Euler's number, n=1 to N key points on the measured and predicted skeletons where corresponding key points (head to head for example) are compared, i=t=0 to T time points or frames, which also is the number of weights for an object over time with one weight for each frame time period, for a single object (or skeleton being tracked).

The distance d is a difference between corresponding key point locations on the measured skeleton and the predicted skeleton. For example, a head key point (302 on FIG. 3) on both the measured and predicted skeleton is differenced, and so on. The distance may be Euclidian distance, but could be other distance operations or algorithms. The $\sigma^2$ is variance that may be a fixed value that can be different for individual key points. By one form, the variance is set according to Lin, T. Y., et al., Microsoft COCO: Common Objects in Context (2014). The $\delta$ is a Heaviside step function that is used with a visible flag $v_n$ where 1 indicates the key point is visible and 0 indicates the key point is not visible in at least one view or perspective from one of the cameras. V is the volume of a 3D bounding box defined to encompass the measured skeleton on the reconstruction.

Referring to equation (2), and to measure the loss between different skeletons, the system simply uses one minus an $oks_i$ value to obtain the $okl_i$ value that is object key point loss. This is performed in order to provide a difference measurement instead of a similarity measurement. The $okl_i$ refers to loss between any measured skeleton and predicted skeleton from the Kalman filter. As a result, indirectly, the $oks_i$, and in turn, more directly, the $okl_i$ is a representation of the sum of the differences between the measured and predicted skeleton at one time point or frame time point. By one form as shown, the sum is sued to form an average key point location difference on the compared skeletons, but other versions of the sum could be used instead, such as a maximum, minimum, mode, and so forth, or other comparison values could be used instead. This is repeated for each measured skeleton found in the reconstruction at a single time point or frame time point, and for each predicted skeleton which is the number of objects (or people or skeletons) detected at a single time point and is being propagated by the Kalman filter.

Process 700 may include "determine historical vector" 708. Specifically, the result of equations (1) and (2) is a set of $okl_i$ for each comparison between a single measured skeleton at time point i and each of the predicted skeletons at time point i. This is repeated for each of the measured skeletons $$S_t^y.$$

Each time (or frame time point) this is performed, the $okl_i$ are placed in the history memory or buffer (such as 620 on FIG. 6) to form the historical vectors. The $okl_i$ of the same measured skeleton can then be regrouped by retrieving the previous $okl_i$'s from the buffer(s) of the same object being tracked to form a historical vector:

$$OKL = [okl_{-T+1}, okl_{-T+2}, \ldots, okl_{-1}, okl_0] \tag{3}$$

For a current time point (or frame), and for each tracked object, person, or player, their history of okl values in the past T time points or frames may be used to build the OKL vector. By one form, T is about 10 to 15 time points or frames. A longer a time duration, and the weights may tend to reduce the older values to near negligible amounts, and with a shorter duration, there is insufficient data for the history to cause a significant effect. By one form, at least three time points should be used to form the OKL vector at a minimum.

Process 700 may include "weight historical vector" 710, where the historical vector is weighted, and by one form, computed by using a SoftMax type of function and several exponential values from the past T steps. One example weight equation may be the following.

$$w_i = \frac{e^{T+i}}{\sum_{i=0}^{-T+1} e^{T+i}} \tag{4}$$

where weights $w_i$ adjust the $okl_i$'s in the final TOKL calculation. The There is time point or frame, and so that one weight exists for each individual time point i. It can be seen that all of the objects (or skeletons being tracked) may have the same weights when the same time points are being used to sample all of the objects. The weights are set so that the older the frame, the less influence on the total cost (or loss). A vector of the weights then may be formed as:

$$W = [w_{-T+1}, w_{-T+2}, \ldots, w_{-1}, w_0] \tag{5}$$

where, as mentioned, it has been found that the method works more than adequately by setting T to about 10 to 15, and more than that is typically unnecessary to improve the results.

The TOKL metric representing the difference or distance between a specific measured skeleton and one of the predicted skeletons over time or during the video sequences is then computed as a dot product of the weight and similarity vector to form a weighted similarity vector such as:

$$TOKL = W * OKL^{Tr} \tag{6}$$

where Tr here is transpose. Thus, the TOKL can be considered to represent loss between a single skeleton of one person in both the current frame and in a series of tracked versions of the skeletons in history, and the TOKL models both spatial and temporal feature correlation and data consistency simultaneously. So arranged with historical information, the TOKL can provide more robust and more accurate skeleton matching and identification even when severe occlusion exists and different skeletons have very similar or overlapping postures. In addition, the TOKL can correct matching results when errors occur in previous time points.

Once the TOKLs are generated, process 700 may include "generate cost matrix" 712, and by one example, this includes "place each TOKL of match between a measured skeleton and a predicted skeleton into a cost matrix" 714. Here, the TOKLs of a current time period are placed in order of a cost matrix (or list representing the cost matrix), where one side N of an N×M matrix has a set of the measured skeletons available at a same time t from the input set of measured skeletons, while another side M of the matrix has each of the predicted skeletons (or detected objects) of the same frame time point. Each TOKL representing a cost of a match between a measured skeleton and predicted skeleton is placed in the correct element location in the matrix that corresponds to the two skeletons forming that TOKL.

Process 700 may include "determine measured skeleton-to-predicted skeleton match using the TOKLs" 716. Thus, a matching algorithm may be used that minimizes the computational load of the matching between the two sets of skeletons. By one example approach, process 700 may include "use Hungarian method" 718. Generally, the Hungarian method matches two sets of data, here the predicted skeletons (or detected objects) and the measured skeletons. Each potential match between one of the predicted skeletons and the measured skeletons has a cost (or difference). The object is to find the match between the two sets with the minimum total cost. The algorithm compares costs arranged in rows and columns in the cost matrix. This can be used to eliminate match combinations between the two sets without the need to use brute force to compare all possible match combinations, thereby reducing a great amount of computational load, time, and power consumption. The algorithm results in matches for individual pairs of measured and predicted skeletons, and according to the matching pairs, if a measured skeleton matches a set of historical skeleton data in the form of a predicted skeleton, the measured skeleton may be assigned to the tracked object (or predicted skeleton).

By one form, the Hungarian algorithm provides the output 719 matched pairs of the system. In this case, in addition to providing the pairs to the Kalman filter to generate the next predicted skeletons, the skeleton ID is determined 738 for the matching predicted skeleton to be output, and the jersey number and team data are assigned 739 to the output predicted skeleton. Specifically, when the output is obtained directly from the Hungarian or matching algorithm, and the tracked skeletons are athletes in a team competition, process 700 then may include "determine skeleton ID for match" 738 and "assign jersey and team data to predicted skeleton" 739. Since the measured skeletons already have a person or player ID, the ID and associated jersey number and other team data can now be assigned to the matched predicted skeleton. Here, a simple but effective data assignment method may be used. As several ok values are stored in the history buffer to form OKL vectors for the past T time points, several associations from the past T time points also may be buffered including storing the measured skeleton person (or player) ID. The IDs can be looked up in the buffer, and then according to the IDs, an association to jersey number and team data (either an address to obtain the data or by storing the data itself) may be determined. The final jersey number and team data can be assigned using a weighted voting method based on the buffered data, while all invalid jersey numbers and team data can be filtered out during this process. The weighted voting method is performed by counting all possible jersey numbers and alternative team data (such as team name) from the history data, and selecting a most frequent jersey number and team data used with a skeleton.

However, and as mentioned, the system may alternatively output the matched predicted skeleton data after the predicted skeleton is refined in the updating operation 722 of the Kalman filter. In this case, the retrieval of IDs 738 and the assignment operation 739 will not occur until after the Kalman updating operation 722.

Continuing now with the Kalman filter, process 700 may include "perform prediction generation for each object" 720. The Kalman filter may be used to update player (or skeleton) tracking status, and then generate predicted skeletons based on the updates. Status (also referred to as inner tracking status or trajectory) here refers to the latest predicted position of a skeleton, and in turn its key points, in light of the history of the positions of that skeleton at frame time points analyzed to form the history. After the first frame as mentioned above, two modes are used to maintain the tracking status: an update mode and a prediction mode, and the modes are operated per object (or per skeleton being tracked).

For the update mode, process 700 may include "update last predictions" 722, where the Kalman filter may update the last current predicted skeleton data. This will refine the position of the key points of the predicted skeleton data. Therefore, this operation may be referred to as correcting the inner tracking status of the tracked person or player, and in turn the predicted skeleton. With current measurement and historical information, the updating enables the next prediction operation to be more accurate and robust. The refined or updated predicted skeleton then may be used as the output final skeleton position as well as be used to generate the next current prediction by the prediction mode of the Kalman filter. The updating process may be summarized as follows.

The updating 722 first may include "generate Kalman gain" 724 as follows.

$$K_i = P_i^{-1} H^{Tr}\left(HP_i^- H^{Tr} + R\right)^{-1} \quad (7)$$

where the Kalman gain (or blending factor) $K_i$ will be used to minimize the error covariance and is provided at each time point or frame i, where matrix H relates the current state (the latest predicted skeleton) to a corresponding measurement skeleton $z_i$, and $$P_i^-$$

is a new updated estimation error covariance matrix. H is generated, as one example, by adding a large identity matrix to a small identity matrix, such as for example:

$$\begin{pmatrix} 1 & & 1 & \\ & 1 & & 1 \\ & & 1 & \\ & & & 1 \end{pmatrix}$$

where the shape of the matrix depends on the length of the skeleton data, $$P_i^-$$

is generated by computing covariance between skeleton coordinates to form a symmetric matrix, but the data does not need to be precise, superscript Tr here is the transpose of the matrix, and R is a covariance matrix of measurement noise and is determined by experimentation before operation of the filter. Matrices H and R are constant here but could be varied by object and/or frame time point.

The updating 722 also may include "update state" 726 to generate the refined and updated predicted skeleton thereby correcting the inner tracking status. Here, the update estimate is determined as follows by using the Kalman gain and the measured skeleton.

$$\hat{x}_i = \hat{x}_i + K_i(z_i - H\tilde{x}_i^-) \quad (8)$$

where $K_i$ and H are as defined above, and where $\hat{x}_i$ is the resulting updated predicted skeleton to be used to generate the next predicted skeleton and may be considered an updated previous predicted skeleton. The predicted skeleton $$\hat{x}_i^-$$

was the current predicted skeleton, and once input to the updating unit, the current predicted skeleton is now considered the previous predicted skeleton already matched to a measured skeleton. The measurement $z_i$ is the corresponding measured skeleton that was matched to the predicted skeleton $$\hat{x}_i^-.$$

For example on system 600 (FIG. 6), say $$S_t'$$

is a current predicted skeleton used to generate a TOKL and used on the Hungarian algorithm to determine a match with a measured skeleton $z_i$. The updating unit 610 receives the current predicted skeleton $$S_t' = \hat{x}_i^-,$$

now referred to as the previous predicted skeleton, and then generates an updated previous predicted skeleton (at 612) so that now updated $$S_t' = \hat{x}_i.$$

Thereafter, updated previous skeleton $$S_t'$$

becomes the previous predicted skeleton $$S_{t-1}'$$

(at 614) to be input to the prediction unit 616 to generate the next current predicted skeleton $$S_t'.$$

The updating operation also may include "update covariance" 728 as follows.

$$P_i = (I - K_i H) P_i^- \tag{9}$$

where $K_i$ and H are as defined above, $P_i$ is the updated covariance matrix, $$P_i^-$$

is the previous covariance matrix, and I is an identity matrix.

Also, the updating operation 722 may include "update which objects are detected on the current frame" 730, and specifically, the current frame time point. Specifically, if a measured skeleton has no match to a predicted skeleton, this measured skeleton data will be used to initiate a new tracking object (predicted skeleton). By one form, a list of detected objects or predicted skeletons will be maintained such as in a memory, and in this case, the new detected person (or athlete or player) may be added to the list. On the other hand, if a tracked object (predicted skeleton) does not receive a match to any measured skeleton data, that unmatched predicted skeleton will be removed from the tracking lists, and will no longer receive a next predicted skeleton by the prediction mode of the Kalman filter.

Turning to the prediction mode now, process 700 may include "generate prediction" 732. The operations of the Kalman filter generates a current estimate predicted skeleton for a current time point or frame at least partly based on the historical inner tracking status updated during the update operations. Since the updating operations factor a matched measured skeleton selected by using the historically-based TOKL, this enables the Kalman filter to provide a new current predicted skeleton based on a previous predicted skeleton, even when no measured skeleton in the input data matches one of the tracked player predicted skeletons. A previous predicted skeleton will be used when the object (or predicted skeleton) has no matched measured skeleton in few consecutive frames, such as about 3 frames, but a predicted skeleton (and object) will be dropped when the object (or predicted skeleton) has no matched measured skeleton for a much longer time period, such as about 30 frames. In addition, the use of the TOKL as mentioned enables the Kalman filter to avoid artifacts by correcting erroneous key point locations caused by inaccurate player bounding box or 2D landmark detection, for example, and thereby resulting in the smoothing of the skeleton tracking results.

To accomplish this, the prediction operation 732 may include "generate prediction state" 734, which is a next current predicted skeleton, as follows.

$$\hat{x}_i^- = A\hat{x}_{i-1} + Bu_i \tag{10}$$

where $$\hat{x}_i^-$$

is a current state (or predicted skeleton), $$\hat{x}_{i-1}^-$$

is the previous updated predicted skeleton obtained from the updating operations, A is a prediction matrix, where B is a control matrix, and $u_i$ is a control vector that are both set to zero for this example due to the subjective nature of the sports. In other alternatives, when control parameters can be controlled by external objects, the control matrix B could be used. The prediction matrix A may be a fixed identity matrix.

Process 700 may include "generate prediction covariance" 736 as follows, and is performed to update the covariance matrix $$P_i^-$$

due to the generation of a new current predicted skeleton $$\hat{x}_i^-$$

as follows.

$$P_i^- = AP_{i-1}A^{Tr} + Q \quad (11)$$

where $$P_i^-$$

is the latest current covariance matrix (also referred to as the current predicted error covariance), and where Q is a covariance matrix of untracked uncertainty or process noise that may be a fixed value determined from a normal distribution variance, while i, A, and Tr are as described above.

The generated predicted skeleton then may be provided to the TOKL unit for generation of TOKLs and subsequent matching between prediction and measured skeletons as described above. Particularly, once the latest current predicted skeleton is generated for a current object (or tracked predicted skeleton), the process loops back to operation 704 to analyze another object (another predicted skeleton) being tracked on the same frame (or same time point). This looping continues until all of the objects (skeletons) to be tracked that exist at a frame time point are analyzed.

Also as mentioned above, once a matched predicted skeleton is refined and updated, it can be output from the system if not already done so after the Hungarian algorithm. In this case then, process 700 first may include "determine skeleton ID for match" 738 for this alternative. The updated predicted skeleton are then associated with the person (or player or athlete) ID associated with the measured skeleton matched to the output predicted skeleton. Once the predicted skeleton has an object or person ID, then the jersey and team data can be associated 739 with the predicted skeleton by a voting process. As mentioned, the ID and other data may be stored in a memory, which could be the history memory or buffer(s) storing one or more of the OKL vectors, or could be another memory.

Whether the output predicted skeleton is obtained after the Hungarian algorithm or after the Kalman filter updating, process 700 may include "provide skeleton. ID, and associated data to track skeleton on current frame" 740. Here, the output predicted skeleton as associated with the measured skeleton may be output with its accompanying ID and other data as mentioned. Tracking or image analysis applications can then use the identification, data, and key point locations of the skeleton to perform further tasks such as generating virtual or POV views and so forth as mentioned herein.

The operations for determining the output predicted skeleton and associated data by using the Kalman filter, TOKL metric, Hungarian algorithm then may be repeated for each predicted skeleton (or tracked object) that exists on the reconstruction at a frame time point.

Once all such objects (or people) at a frame time point are analyzed, process 700 then may include the inquiry "last frame?" 742. If so, the process ends, and if not, process 700 may include "obtain next frame" 744, where the process loops back to operation 702 to analyze the skeletons on the next frame (or more precisely, next frame time point) to be used for the skeleton tracking.

Experimental Results

To validate the effectiveness of the disclosed method, a dataset of 66 clips of an actual athletic event (American football) was used for testing. The results listed in Table 1 below are based on PCK@0.5 m (see Andrluka. M. et al., "2D Human Pose Estimation: New Benchmark and State of the Art Analysis". Computer Vision and Pattern Recognition (CVPR). IEEE, (2014)) to determine whether the correct tracking joints (or key points) are on a matching skeleton. More specifically, the experiment determined whether the joints of a player has the correct predicted jersey number and team data, and has an acceptable distance between predicted locations of the joints and ground truth locations that is within 0.5 m. By one form, skeletons with fourteen key points (or joints) were used as the skeleton key points as in FIG. 3. The results for these points are separated into eight columns below with left and right skeleton key points being averaged together in the same column (i.e., except for head and neck key points).

TABLE 1

Evaluation in Sports Dataset

| | Head | Neck | Shldr. | Elbw. |
|---|---|---|---|---|
| Precision | 92.96% | 92.92% | 92.96% | 91.64% |
| Recall | 91.26% | 91.23% | 90.98% | 89.99% |

| | Wrist | Hip | Knee | Ankle | Mean |
|---|---|---|---|---|---|
| Precision | 90.02% | 92.03% | 91.95% | 90.80% | 91.72% |
| Recall | 88.42% | 90.38% | 90.30% | 89.19% | 90.07% |

Referring to FIGS. 8A-12B, images 800 to 1202 show an example of skeleton tracking results in 3D space rendered using the disclosed process. Images 800, 900, 1000, 1100, and 1200 respectively show captured frames 10, 20, 30, 40, and 50 from a fixed perspective to represent the input images from one of the video sequences. Corresponding resulting tracking images 802, 902, 1002, 1102, and 1202 respectively associated with the frames mentioned above show jersey number and team data drawn on a ground plane in the images, while red or blue color is provided to indicate different teams (which may not be visible here). As shown, the disclosed method works well even in occlusion and deformation cases.

It will be appreciated that the processes 400, 500, and 700 respectively explained with FIGS. 4-5 and 7A-7B do not necessarily have to be performed in the order shown, nor with all of the operations shown. It will be understood that some operations may be skipped or performed in different orders.

Also, any one or more of the operations of FIGS. 4-5 and 7A-7B may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 13:
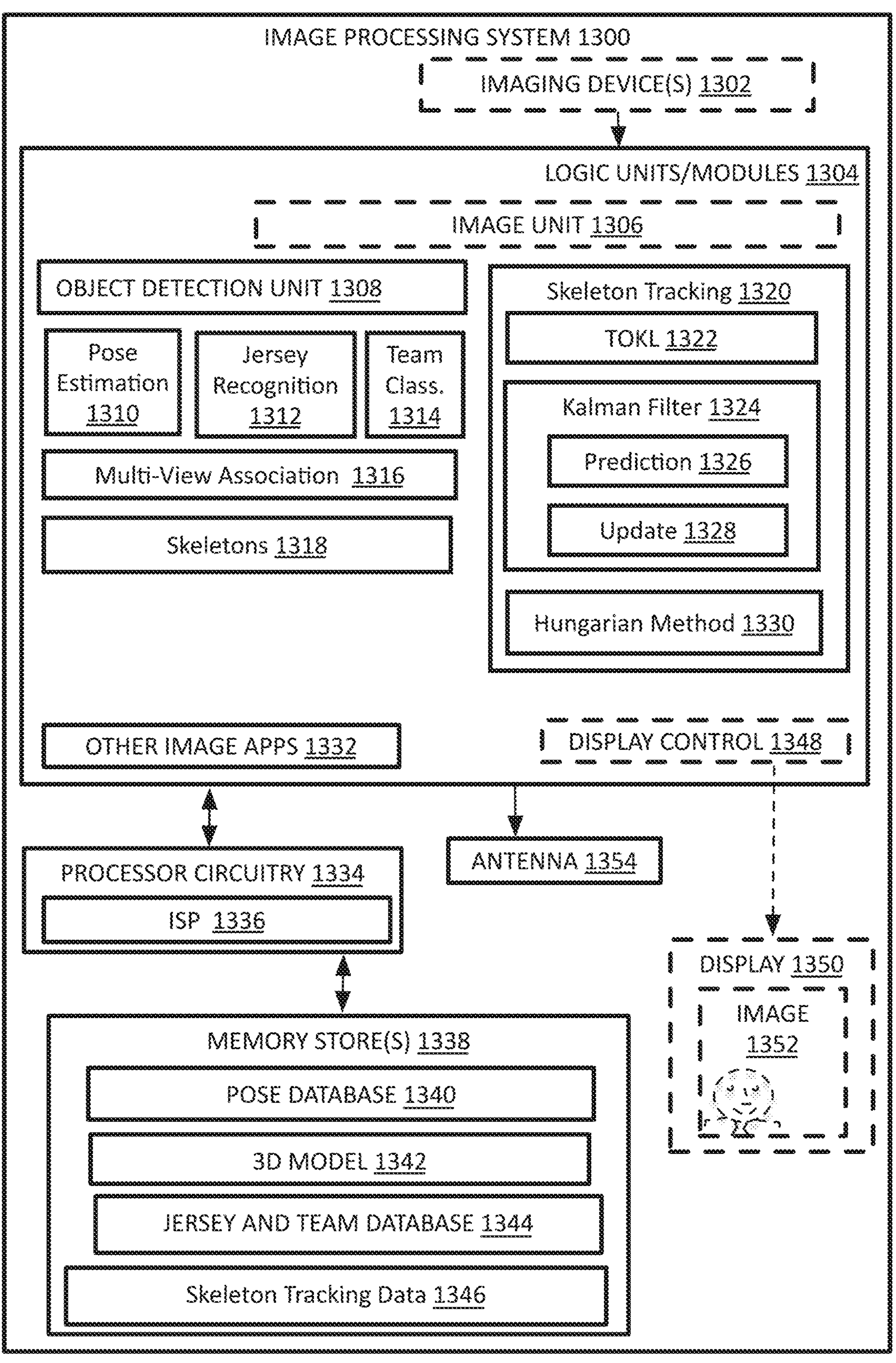
FIG. 13 is an illustrative diagram of an example system.

Referring to FIG. 13, an example image processing system 1300 is arranged in accordance with at least some implementations of the present disclosure. In various implementations, the example image processing system 1300 may have one or more imaging devices 1302 to form or receive captured image data, and this may include either one or more cameras such as an array of cameras around an athletic field, stage or other such event location and pointed toward athletic events or other types of objects in motion. Thus, in one form, the image processing system 1300 may be a digital camera or other image capture device that is one of the cameras in an array of the cameras. In this case, the imaging device(s) 1302 may be the camera hardware and camera sensor software, module, or component. In other examples, imaging processing system 1300 may have an imaging device 1302 that includes, or may be, one camera or some or all of the cameras in the array, and logic modules 1304 may communicate remotely with, or otherwise may be communicatively coupled to, the imaging device 1302 for further processing of the image data.

Accordingly, the part of the image processing system 1300 that holds the logic units 1304 and that processes the images may be on one of the cameras or may be on a separate device included in, or entirely forming, the image processing system 1300. Thus, the image processing system 1300 may be a desktop or laptop computer, remote server, or mobile computing device such as a smartphone, tablet, or other device. It also could be or have a fixed function device such as a set top box (cable box or satellite box), game box, or a television. The camera(s) 1302 may be wirelessly communicating, or wired to communicate, image data to the logic units 1304.

In any of these cases, such technology may include a camera such as a digital camera system, a dedicated camera device, web cam, or any other device with a camera, a still camera and so forth for the run-time of the system as well as for model learning and/or image collection for generating predetermined personal image data. One or more of the cameras may be RGB cameras or RGB-D cameras, but could be YUV or IR cameras. Thus, in one form, imaging device 1302 may include camera hardware and optics including one or more sensors as well as auto-focus, zoom, aperture, ND-filter, auto-exposure, flash, actuator controls, and so forth. By one form, the cameras may be fixed in certain degrees of freedom, or may be free to move in certain or all directions.

The logic modules 1304 of the image processing system 1300 may include, or communicate with, an image unit 1306 that performs at least partial processing. Thus, the image unit 1306 may perform pre-processing, decoding, encoding, and/or even post-processing to prepare the image data for transmission, storage, and/or display. It will be appreciated that the pre-processing performed by the image unit 1306 could be by modules located on one or each of the cameras, a separate image processing unit 1300, or other location.

In the illustrated example, the logic modules 1304 also may include an object recognition unit 1308, pose estimation unit 1310, jersey recognition unit 1312, team classification unit 1314, multi-view association unit 1316, skeletons unit 1318, and skeleton tracking unit 1320. The skeleton tracking unit 1320 has a TOKL unit 1322, Kalman filter unit 1324 with a prediction unit 1326 and an update unit 1328, and a Hungarian method unit 1330. These units or components may be used to perform the skeleton tracking as described herein. The logic units 1304 may perform the same tasks as the units of system 600 and those used to perform the methods 500 and 700 where the title of the unit indicates at least which tasks the unit performs. One or more downstream applications 1332 also may be provided to use the skeleton tracking matches and identification data to perform final action recognition and analysis, virtual view generation, and/or to perform other tasks.

These units may be operated by, or even entirely or partially located at, processor(s) (or more particularly, processor circuitry) 1334, such as the Intel Atom, and which may include a dedicated image signal processor (ISP) 1336, to perform many of the operations mentioned herein. The logic modules 1304 may be communicatively coupled to the components of the imaging device 1302 in order to receive raw image data. The image processing system 1300 also may have one or more memory stores 1338 which may or may not hold the image data being analyzed, pose images database 1340, 3D model (or reconstruction) 1342, Jersey and team database 1344, and skeleton tracking data 1346 which may include measured and predicted skeleton key points, the history buffer at least holding OKL data and may be holding associated data as mentioned above, and other apps, as well as other image data or logic units mentioned above, and antenna 1354. In one example implementation, the image processing system 1300 may have at least processor circuitry 1334 communicatively coupled to a display 1350, and at least one memory 1338 communicatively coupled to the processor circuitry to perform the operations described herein as explained above.

The image unit 1306, which may have an encoder and decoder, and antenna 1354 may be provided to compress and decompress the image date for transmission to and from other devices that may display or store the images. This may refer to transmission of image data among the cameras, and the logic units 1304. Otherwise, the processed image 1352 may be displayed on the display 1350 or stored in memory 1338 for further processing as described above. As illustrated, any of these components may be capable of communication with one another and/or communication with portions of logic modules 1304 and/or imaging device 1302. Thus, processors (or processor circuitry) 1334 may be communicatively coupled to both the image devices 1302 and the logic modules 1304 for operating those components. By one approach, although image processing system 1300, as shown in FIG. 13, may include one particular set of unit or actions associated with particular components or modules, these units or actions may be associated with different components or modules than the particular component or module illustrated here.

Figure 14:
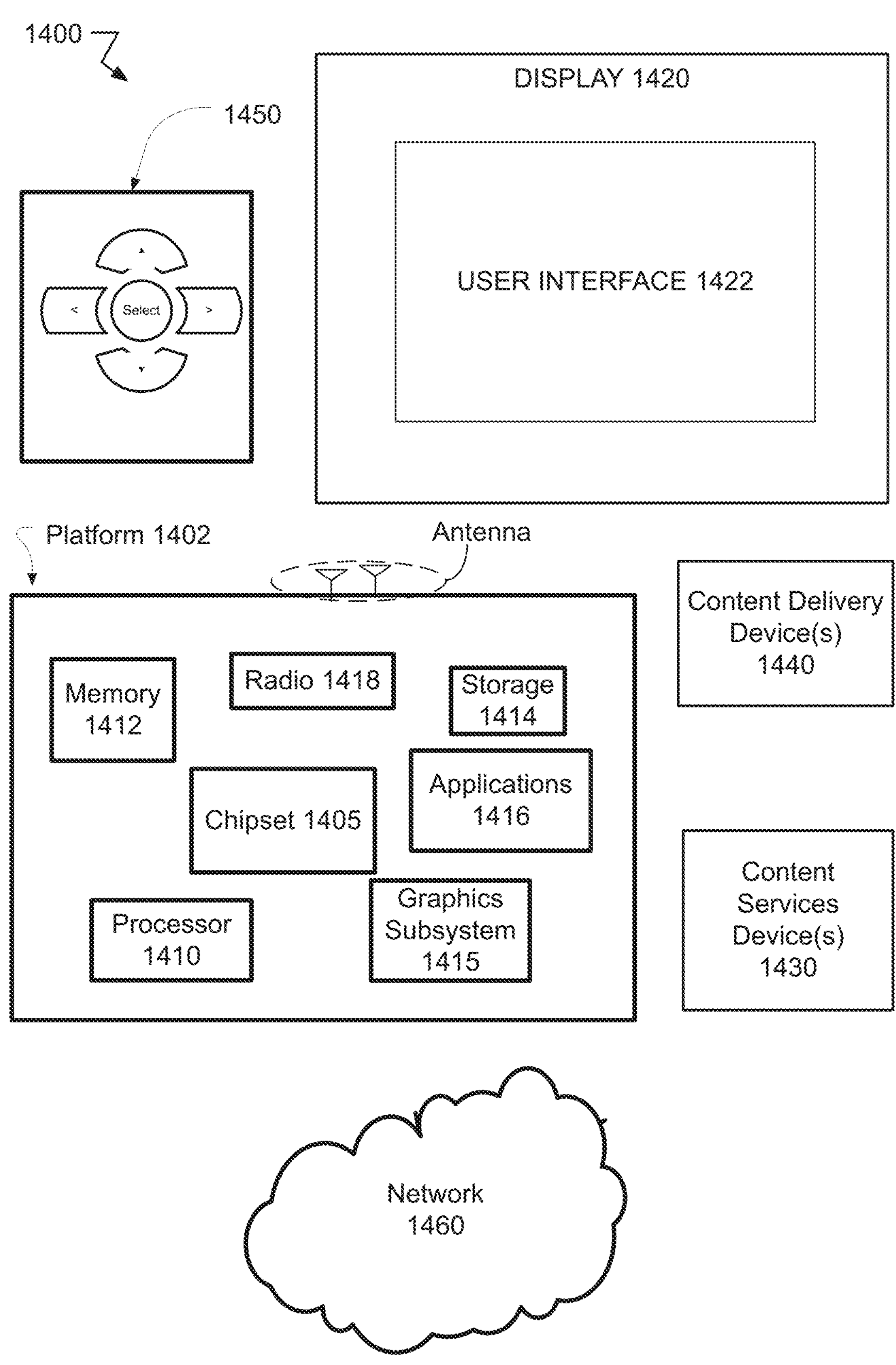
FIG. 14 is an illustrative diagram of another example system.

Referring to FIG. 14, an example system 1400 in accordance with the present disclosure operates one or more aspects of the image processing system described herein. It will be understood from the nature of the system components described below that such components may be associated with, or used to operate, certain part or parts of the image processing systems described above including performance of a camera system operation described above. In various implementations, system 1400 may be a media system although system 1400 is not limited to this context. For example, system 1400 may be incorporated into a digital video camera, or one or more cameras of a camera array, mobile device with camera or video functions such as an imaging phone, webcam, personal computer (PC), remote server, laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1400 includes a platform 1402 coupled to a display 1420. Platform 1402 may receive content from a content device such as content services device(s) 1430 or content delivery device(s) 1440 or other similar content sources. A navigation controller 1450 including one or more navigation features may be used to interact with, for example, platform 1402 and/or display 1420. Each of these components is described in greater detail below.

In various implementations, platform 1402 may include any combination of a chipset 1405, processor 1410, memory 1412, storage 1414, graphics subsystem 1415, applications 1416 and/or radio 1418. Chipset 1405 may provide intercommunication among processor 1410, memory 1412, storage 1414, graphics subsystem 1415, applications 1416 and/or radio 1418. For example, chipset 1405 may include a storage adapter (not depicted) capable of providing intercommunication with storage 1414.

Processor 1410 may be implemented as processor circuitry with a Complex Instruction Set Computer (CISC) or Reduced Instruction Set Computer (RISC) processors: x86 instruction set compatible processors, multi-core, or any other microprocessor or central processing unit (CPU). In various implementations, processor 1410 may be dual-core processor(s), dual-core mobile processor(s), and so forth.

Memory 1412 may be implemented as a volatile memory device such as, but not limited to, a Random Access Memory (RAM), Dynamic Random Access Memory (DRAM), or Static RAM (SRAM).

Storage 1414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1414 may include technology to increase the storage performance enhanced protection for valuable digital media when multiple hard drives are included, for example.

Graphics subsystem 1415 may perform processing of images such as still or video for display. Graphics subsystem 1415 may be a graphics processing unit (GPU) or a visual processing unit (VPU), for example, and may or may not include an image signal processor (ISP). An analog or digital interface may be used to communicatively couple graphics subsystem 1415 and display 1420. For example, the interface may be any of a High-Definition Multimedia Interface, Display Port, wireless HDMI, and/or wireless HD compliant techniques. Graphics subsystem 1415 may be integrated into processor 1410 or chipset 1405. In some implementations, graphics subsystem 1415 may be a stand-alone card communicatively coupled to chipset 1405.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1418 may operate in accordance with one or more applicable standards in any version.

In various implementations, display 1420 may include any television type monitor or display. Display 1420 may include, for example, a computer display screen, touch screen display, video monitor, television-like device, and/or a television. Display 1420 may be digital and/or analog. In various implementations, display 1420 may be a holographic display. Also, display 1420 may be a transparent surface that may receive a visual projection. Such projections may convey various forms of information, images, and/or objects. For example, such projections may be a visual overlay for a mobile augmented reality (MAR) application. Under the control of one or more software applications 1416, platform 1402 may display user interface 1422 on display 1420.

In various implementations, content services device(s) 1430 may be hosted by any national, international and/or independent service and thus accessible to platform 1402 via the Internet, for example. Content services device(s) 1430 may be coupled to platform 1402 and/or to display 1420. Platform 1402 and/or content services device(s) 1430 may be coupled to a network 1460 to communicate (e.g., send and/or receive) media information to and from network 1460. Content delivery device(s) 1440 also may be coupled to platform 1402 and/or to display 1420.

In various implementations, content services device(s) 1430 may include a cable television box, personal computer, network, telephone, Internet enabled devices or appliance capable of delivering digital information and/or content, and any other similar device capable of unidirectionally or bidirectionally communicating content between content providers and platform 1402 and/display 1420, via network 1460 or directly. It will be appreciated that the content may be communicated unidirectionally and/or bidirectionally to and from any one of the components in system 1400 and a content provider via network 1460. Examples of content may include any media information including, for example, video, music, medical and gaming information, and so forth.

Content services device(s) 1430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1402 may receive control signals from navigation controller 1450 having one or more navigation features. The navigation features of controller 1450 may be used to interact with user interface 1422, for example. In implementations, navigation controller 1450 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1450 may be replicated on a display (e.g., display 1420) by movements of a pointer, cursor, focus ring, or other visual indicators displayed on the display. For example, under the control of software applications 1416, the navigation features located on navigation controller 1450 may be mapped to virtual navigation features displayed on user interface 1422, for example. In implementations, controller 1450 may not be a separate component but may be integrated into platform 1402 and/or display 1420. The present disclosure, however, is not limited to the elements or in the context shown or described herein.

In various implementations, drivers (not shown) may include technology to enable users to instantly turn on and off platform 1402 like a television with the touch of a button after initial boot-up, when enabled, for example. Program logic may allow platform 1402 to stream content to media adaptors or other content services device(s) 1430 or content delivery device(s) 1440 even when the platform is turned "off" In addition, chipset 1405 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1400 may be integrated. For example, platform 1402 and content services device(s) 1430 may be integrated, or platform 1402 and content delivery device(s) 1440 may be integrated, or platform 1402, content services device(s) 1430, and content delivery device(s) 1440 may be integrated, for example. In various implementations, platform 1402 and display 1420 may be an integrated unit. Display 1420 and content service device(s) 1430 may be integrated, or display 1420 and content delivery device(s) 1440 may be integrated, for example. These examples are not meant to limit the present disclosure.

In various implementations, system 1400 may be implemented as a wireless system, a wired system, or a combination of both. When implemented as a wireless system, system 1400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 14.

Figure 15:
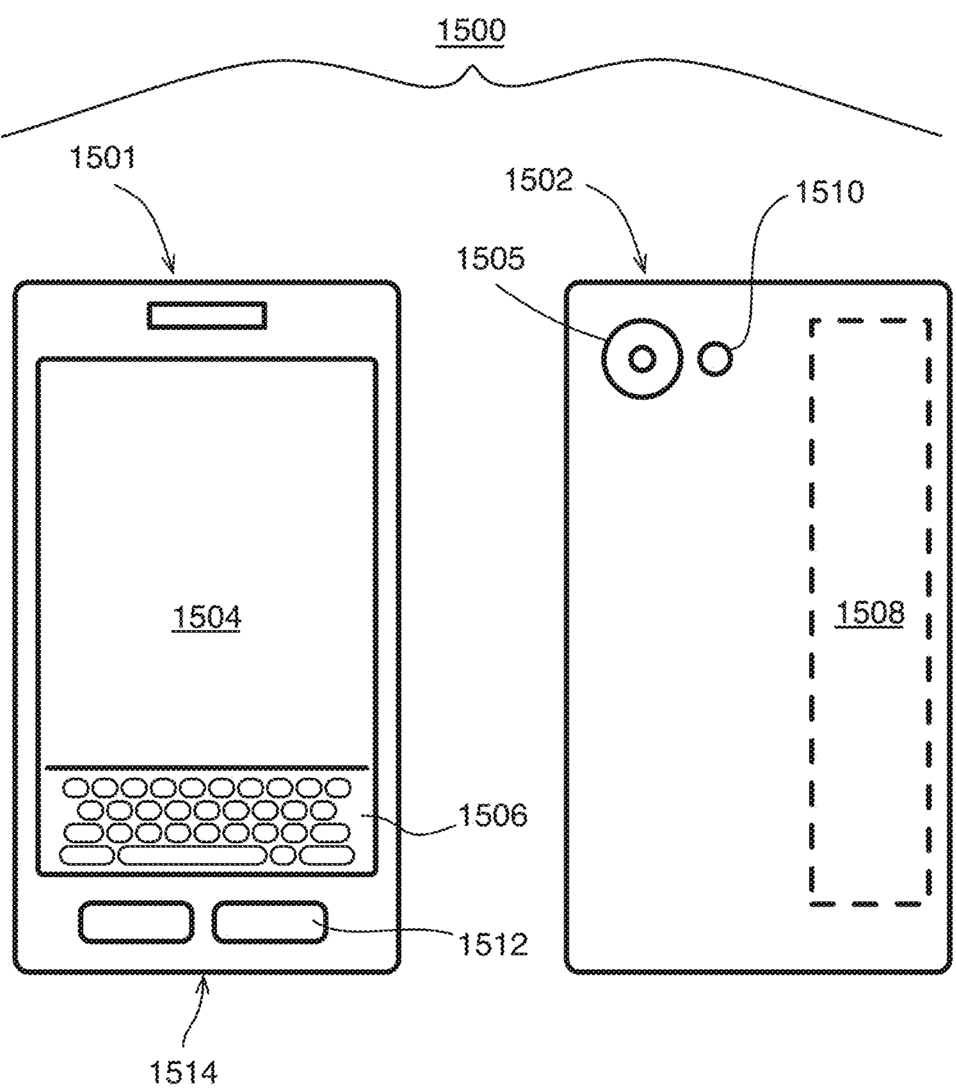
FIG. 15 illustrates another example device, all arranged in accordance with at least some implementations of the present disclosure.

Referring to FIG. 15, a small form factor device 1500 is one example of the varying physical styles or form factors in which systems 1300 or 1400 may be embodied. By this approach, device 1300 may be implemented as a mobile computing device 1500 having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 15, device 1500 may include a housing with a front 1501 and a back 1502. Device 1500 includes a display 1504, an input/output (I/O) device 1506, and an integrated antenna 1508. Device 1500 also may include navigation features 1512. I/O device 1506 may include any suitable I/O device for entering information into a mobile computing device. Examples for I/O device 1506 may include an alphanumeric keyboard, a numeric keypad, a touch pad, input keys, buttons, switches, microphones, speakers, voice recognition device and software, and so forth. Information also may be entered into device 1500 by way of microphone 1514, or may be digitized by a voice recognition device. As shown, device 1500 may include a camera 1505 (e.g., including at least one lens, aperture, and imaging sensor) and a flash 1510 integrated into back 1502 (or elsewhere) of device 1500. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor (or processor circuitry), which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By at least one first example implementation, a computer-implemented method of image processing comprises obtaining a plurality of video sequences of a same scene with people; and tracking a position of at least one of the people and tracked in a reconstruction of the scene formed by using the video sequences, comprising: obtaining measured skeletons of the people in the reconstruction; generating predicted skeletons each estimating a skeleton position of at least one of the people in the reconstruction; generating temporal object key point losses (TOKLs) that each represent a cost of a match between one of the measured skeletons and one of the predicted skeletons, wherein the TOKLs individually factor a history of positions of one of the skeletons and associated with multiple frames of the individual video sequences; and generating a match between individual measured skeletons and individual predicted skeletons comprising using the TOKLs.

By one or more second example implementation, and further to the first implementation, wherein generating TOKLs comprises using a weighted vector of historical object key point loss (okl) values.

By one or more third example implementations, and further to the first implementation, wherein generating TOKLs comprises using a weighted vector of historical object key point loss (okl) values, and wherein weights of the weighted vector are arranged to reduce the influence of a historical okl depending at least in part on which time point along frames of the video sequences is represented by the historical okl.

By one or more fourth example implementations, and further to any of the first to third implementation, wherein generating the TOKLs comprises generating object key point similarities (oks's) that each represent a comparison of a measured skeleton to a predicted skeleton.

By one or more fifth example implementations, and further to any of the first to third implementation, wherein generating the TOKLs comprises generating object key point similarities (oks's) that each represent a comparison of a measured skeleton to a predicted skeleton, and wherein the comparison comprises determining the difference in location between at least one key point on a measured skeleton and a corresponding key point on a predicted skeleton.

By one or more sixth example implementations, and further to any of the first to third implementation, wherein generating the TOKLs comprises generating object key point similarities (oks's) that each represent a comparison of a measured skeleton to a predicted skeleton, wherein the comparison comprises determining the difference in location between at least one key point on a measured skeleton and a corresponding key point on a predicted skeleton, and wherein the oks is an average of the differences in location between the key points on a measured skeleton and the corresponding key points on a predicted skeleton.

By one or more seventh example implementations, and further to any of the fourth to sixth implementation, wherein 1−oks=object key point loss (okl) that is used to form the TOKL.

By one or more eighth example implementations, and further to any of the first to seventh implementation, wherein generating the match comprises using a Hungarian algorithm wherein the TOKLs are the costs in a matrix for matching measured skeletons to predicted skeletons.

By one or more ninth example implementations, and further to any of the first to eighth implementation, wherein generating the predicted skeletons comprises using a Kalman filter, and the method comprising: after generating the match, updating a matched skeleton by the Kalman filter, and outputting the updated and matched skeleton as a tracked skeleton.

By one or more tenth example implementations, a computer-implemented system comprises at least one memory to store image data of frames of a video sequence with content showing at least one person in motion; and processor circuitry communicatively coupled to the memory and being arranged to operate by: obtaining a plurality of video sequences of a same scene with people; and tracking a position of at least one of the people as one of the people moves over time in the video sequences and tracked in a reconstruction of the scene formed by using the video sequences, comprising: obtaining measured skeletons of the people in the reconstruction; generating predicted skeletons estimating a skeleton position of at least one of the people in the reconstruction; generating temporal object key point losses (TOKLs) that each represent a cost of a match between one of the measured skeletons and one of the predicted skeletons, wherein the TOKLs individually factor a history of positions of the individual skeletons and along multiple frames of the video sequences; and generating a match between individual measured skeletons and individual predicted skeletons comprising using the TOKLs.

By one or more eleventh example implementations, and further to the tenth implementation, wherein generating TOKLs comprises performing a dot product between a weight vector and a vector of historical object key point loss (OKL) values that each represent a time period of a different frame along a video sequence.

By one or more twelfth example implementations, and further to the tenth implementation, wherein generating TOKLs comprises performing a dot product between a weight vector and a vector of historical object key point loss (OKL) values that each represent a time period of a different frame along a video sequence, and wherein each vector of historical OKL represents skeleton positions at time periods of at least three different frames along one of the video sequences.

By one or more example thirteenth implementations, and further to any one of the tenth to the twelfth implementation, wherein generating predicted skeletons is performed by a Kalman filter where a prediction state is a predicted skeleton having key point locations.

By one or more fourteenth example implementations, and further to any one of the tenth to the twelfth implementation, wherein generating predicted skeletons is performed by a Kalman filter where a prediction state is a predicted skeleton having key point locations, and wherein the Kalman filter performs updating of a last predicted skeleton to form an updated matched predicted skeleton before forming a current predicted skeleton.

By one or more fifteenth example implementations, and further to any one of the tenth to the twelfth implementation, wherein generating predicted skeletons is performed by a Kalman filter where a prediction state is a predicted skeleton having key point locations, wherein the Kalman filter performs updating of a last predicted skeleton to form an updated matched predicted skeleton before forming a current predicted skeleton, and wherein the processor circuitry operates by using the updated matched predicted skeleton both as output as a tracked skeleton and to generate the current predicted skeleton.

By one or more sixteenth example implementations, and further to any of the tenth to fifteenth implementation, wherein generating a match between individual measured skeletons and individual predicted skeletons comprises using the TOKLs in a Hungarian algorithm.

By one or more seventeenth example implementations, and further to any of the tenth to fifteenth implementation, wherein generating a match between individual measured skeletons and individual predicted skeletons comprises using the TOKLs in a Hungarian algorithm, and wherein the processor circuitry operates by outputting a matched prediction skeleton as a tracked prediction skeleton directly after the Hungarian algorithm while also inputting the matched prediction skeleton into a Kalman filter to generate the next prediction skeleton.

By one or more eighteenth example implementations, at least one non-transitory machine-readable medium comprises instructions that in response to being executed on a computing device, cause the computing device to operate by: obtaining a plurality of video sequences of a same scene with people; and tracking a position of at least one of the people and tracked in a reconstruction of the scene formed by using the video sequences, comprising: obtaining measured skeletons of the people in the reconstruction; generating predicted skeletons from a Kalman filter; generating temporal object key point losses (TOKLs) that each at least represent a history of differences between the measured and predicted skeletons; and generating matches between individual measured skeletons and individual predicted skeletons comprising using the TOKLs.

By one or more nineteenth example implementations, wherein the instructions cause the computing device to operate by performing history-influenced updating, by the Kalman filter, of one or more predicted skeletons matched to the measured skeletons.

By one or more twentieth example implementations, and further to any of the eighteenth to nineteenth implementations, wherein the TOKLs each represent a cost of a match between one of the measured skeletons and one of the predicted skeletons, wherein the TOKLs individually factor a history of positions of the individual skeletons and along multiple frames of the video sequences.

By one or more twenty-first example implementations, and further to any of the eighteenth to twentieth implementations, wherein generating the TOKLs comprises weighting a vector of a version of historical object key point similarities that each factor differences of corresponding key point location of the measured and predicted skeletons.

By one or more twenty-second implementations, and further to any of the eighteenth to twenty-first implementations, wherein generating TOKLs comprises performing a dot product between a weight vector and a vector of historical object key point loss (OKL) values that each represent a time period of a different frame along a video sequence.

By one or more twenty-third implementations, and further to any of the eighteenth to twenty-second implementations, wherein the measured skeletons are individually associated with at least one of an identification of a person, an athletic jersey number, and an athletic team, and that is held in memory for assignment to a predicted skeleton.

In one or more twenty-fourth example implementations, a device or system includes a memory and a processor to perform a method according to any one of the above implementations.

In one or more twenty-fifth example implementations, at least one machine readable medium includes a plurality of instructions that in response to being executed on a computing device, cause the computing device to perform a method according to any one of the above implementations.

In one or more twenty-sixth implementations, an apparatus may include means for performing a method according to any one of the above implementations.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A method comprising:

generating current predicted skeletons corresponding respectively to different identified people associated with a reconstruction of a scene at a current frame, the reconstruction based on a plurality of video sequences associated with different perspectives of the scene, the current predicted skeletons being based on histories of previous predicted skeletons corresponding respectively to the identified people at previous frames relative to the current frame;

generating loss values that represent differences between a measured skeleton obtained from the reconstruction of the scene at the current frame and respective series of predicted skeletons corresponding respectively to the different identified people, respective ones of the series of predicted skeletons including respective ones of the current predicted skeletons and respective ones of the histories of previous predicted skeletons corresponding respectively to the different identified people; and matching the measured skeleton to one of the identified people based on the loss values.

2. The method of claim 1, wherein ones of the loss values are based on a weighted vector of historical object key point loss values.

3. The method of claim 2, including weighting the historical object key point loss values based on respective ages of the historical object key point loss values to generate the weighted vector.

4. The method of claim 1, wherein the loss values are first loss values, and the generating of the first loss values includes generating a first one of the first loss values based on a plurality of second loss values, respective ones of the second loss values to represent differences between the measured skeleton and corresponding ones of the predicted skeletons in a first one of the series of predicted skeletons corresponding a first one of the identified people.

5. The method of claim 4, including:

determining at least one distance between at least one visible key point on the measured skeleton and at least one corresponding visible key point on a first one of the predicted skeletons in the first one of the series of predicted skeletons; and determining a first one of the second loss values based on the at least one distances.

6. The method of claim 4, wherein the generating of the first one of the first loss values is based on an average of the second loss values.

7. The method of claim 1, wherein the matching is based on a Hungarian algorithm, the Hungarian algorithm based on including the loss values.

8. The method of claim 1, wherein the generating of the current predicted skeletons includes:

filtering a first one of the histories of previous predicted skeletons corresponding to a first one of the identified people based on a Kalman filter to determine a first one of the current predicted skeletons corresponding to the first one of the identified people; and after matching the measured skeleton to the first one of the identified people, updating the first one of the current predicted skeletons based on the measured skeleton to determine an updated predicted skeleton corresponding to the first one of the identified people.

9. The method of claim 8, including filtering at least the updated predicted skeleton based on the Kalman filter to determine a subsequent predicted skeleton corresponding to the first one of the identified people, the subsequent predicted skeleton corresponding to a subsequent frame after the current frame.

10. A computer-implemented system comprising:
at least one memory;
machine-readable instructions; and
at least one processor circuit to be programmed based on the machine-readable instructions to:
generate current predicted skeletons corresponding respectively to different identified people associated with a reconstruction of a scene at a current frame, the reconstruction based on a plurality of video sequences associated with different perspectives of the scene, the current predicted skeletons being based on histories of previous predicted skeletons corresponding respectively to the identified people at previous frames relative to the current frame;
generate loss values that represent differences between a measured skeleton obtained from the reconstruction of the scene at the current frame and respective series of predicted skeletons corresponding respectively to the different identified people, respective ones of the series of predicted skeletons including respective ones of the current predicted skeletons and respective ones of the histories of previous predicted skeletons corresponding respectively to the different identified people; and
a match the measured skeleton to one of the identified people based on the loss values.

11. The system of claim 10, wherein the loss values are first loss values, and one or more of the at least one processor circuit is to generate a first one of the first loss values based on a plurality of second loss values, respective ones of the second loss values to represent differences between the measured skeleton and corresponding ones of the predicted skeletons in a first one of the series of predicted skeletons corresponding a first one of the identified people.

12. The system of claim 11, wherein one or more of the at least one processor circuit is to:
determine at least one distance between at least one visible key point on the measured skeleton and at least one corresponding visible key point on a first one of the predicted skeletons in the first one of the series of predicted skeletons; and
determine a first one of the second loss values based on the at least one distances.

13. The system of claim 11, wherein one or more of the at least one processor circuit is to generate the first one of the first loss values based on an average of the second loss values.

14. The system of claim 10, wherein one or more of the at least one processor circuit is to:
filter a first one of the histories of previous predicted skeletons corresponding to a first one of the identified people based on a Kalman filter to determine a first one of the current predicted skeletons corresponding to the first one of the identified people.

15. The system of claim 14, wherein one or more of the at least one processor circuit is to update the first one of the current predicted skeletons based on the measured skeleton to form an updated predicted skeleton corresponding to the first one of the identified people.

16. The system of claim 15, wherein one or more of the at least one processor circuit is to filter at least the updated predicted skeleton based on the Kalman filter to generate a subsequent predicted skeleton corresponding to the first one of the identified people, the subsequent predicted skeleton corresponding to a subsequent frame after the current frame.

17. The system of claim 10, wherein one or more of the at least one processor circuit is to match the measured skeleton based on a Hungarian algorithm, the Hungarian algorithm based on a matrix including the loss values.

18. At least one non-transitory machine-readable medium comprising instructions, to cause a computing device to at least:
generate current predicted skeletons corresponding respectively to different identified people associated with a reconstruction of a scene at a current frame, the reconstruction based on a plurality of video sequences associated with different perspectives of the scene, the current predicted skeletons being based on histories of previous predicted skeletons corresponding respectively to the identified people at previous frame relative to the current frame;
generate loss values that represent differences between a measured skeleton obtained from the reconstruction of the scene at the current frame and respective series of predicted skeletons corresponding respectively to the different identified people, respective ones of the series of predicted skeletons including respective ones of the current predicted skeletons and respective ones of the histories of previous predicted skeletons corresponding respectively to the different identified people; and
match the measured skeleton to one of the identified people based on the loss values.

19. The medium of claim 18, wherein the instructions are to cause the computing device to:
filter a first one of the histories of previous predicted skeletons corresponding to a first one of the identified people based on a Kalman filter to determine a first one of the current predicted skeletons corresponding to the first one of the identified people; and
update the first one of the current predicted skeletons based on the measured to form an updated predicted skeleton corresponding to the first one of the identified people.

20. The medium of claim 19, wherein the instructions are to cause the computing device to filter at least the updated predicted skeleton based on the Kalman filter to generate a subsequent predicted skeleton corresponding to the first one of the identified people, the subsequent predicted skeleton corresponding to a subsequent frame after the current frame.

* * * * *